United States Patent  
Petitt, Jr. et al.

(10) Patent No.: US 9,304,667 B2  
(45) Date of Patent: Apr. 5, 2016

(54) SYSTEM, DEVICES, AND PLATFORM FOR EDUCATION, ENTERTAINMENT

(71) Applicants: Felix Houston Petitt, Jr., Key West, FL (US); Felix H. Petitt, Sr., Key West, FL (US)

(72) Inventors: Felix Houston Petitt, Jr., Key West, FL (US); Felix H. Petitt, Sr., Key West, FL (US)

( * ) Notice: Subject to any disclaimer, the term of this patent is extended or adjusted under 35 U.S.C. 154(b) by 0 days.

(21) Appl. No.: 14/327,406

(22) Filed: Jul. 9, 2014

(65) Prior Publication Data  
US 2015/0019981 A1 Jan. 15, 2015

Related U.S. Application Data

(60) Provisional application No. 61/845,763, filed on Jul. 12, 2013.

(51) Int. Cl.  
G06F 15/16 (2006.01)  
G06F 3/0484 (2013.01)  
H04L 29/06 (2006.01)

(52) U.S. Cl.  
CPC ........ *G06F 3/04842* (2013.01); *H04L 65/4084* (2013.01); *H04L 65/4092* (2013.01); *H04L 65/60* (2013.01)

(58) Field of Classification Search  
CPC ............ H04L 29/08667; H04L 65/60–65/607; H04W 4/02–4/027  
See application file for complete search history.

(56) References Cited

U.S. PATENT DOCUMENTS

| 5,434,913 | A | * | 7/1995 | Tung et al. | 379/202.01 |
| 6,078,260 | A | * | 6/2000 | Desch | 340/573.1 |
| 6,785,824 | B1 | * | 8/2004 | Grassle | 726/30 |
| 7,006,993 | B1 | * | 2/2006 | Cheong et al. | 705/38 |
| 2002/0133708 | A1 | * | 9/2002 | Gudorf et al. | 713/186 |
| 2003/0061111 | A1 | * | 3/2003 | Dutta et al. | 705/26 |
| 2008/0010173 | A1 | * | 1/2008 | Rendich et al. | 705/28 |
| 2008/0134043 | A1 | * | 6/2008 | Georgis et al. | 715/733 |
| 2008/0228868 | A1 | * | 9/2008 | Sivakoff | 709/203 |
| 2008/0307339 | A1 | * | 12/2008 | Boro et al. | 715/764 |
| 2009/0217342 | A1 | * | 8/2009 | Nadler | 726/1 |
| 2010/0077036 | A1 | * | 3/2010 | DeLuca et al. | 709/206 |
| 2012/0295510 | A1 | * | 11/2012 | Boeckle | 446/72 |
| 2013/0263001 | A1 | * | 10/2013 | Doronichev et al. | 715/719 |
| 2014/0139450 | A1 | * | 5/2014 | Levesque et al. | 345/173 |
| 2014/0356845 | A1 | * | 12/2014 | Huber | 434/362 |

* cited by examiner

*Primary Examiner* — Brendan Higa  
(74) *Attorney, Agent, or Firm* — James A. Italia; Italia IP

(57) ABSTRACT

A system, platform and network are disclosed. The system may be at least partially enabled by one or more processors, and may include a first device having a display for displaying a selected content item made accessible to the first device via download and/or streaming from a network. The first device may have a first device input to interact with the content item. A second device may be coupled to the network and may be configured to control access to and/or to monitor the use of the content item by the first device. A heuristics module may be included for determining whether the first device has utilized the content item to a level of utilization greater than a predetermined value and to form a suggestion based on the determination made by the heuristics module. A communication module may be included to send the suggestion to the second device to provide the first device with an updated and/or a second content item.

19 Claims, 34 Drawing Sheets

SYSTEM, DEVICES, AND PLATFORM FOR EDUCATION, ENTERTAINMENT

CROSS REFERENCE TO RELATED APPLICATIONS

The present application is a continuation-in-part of and claims priority to U.S. Patent Application No. 61/845,763, filed Jul. 12, 2014 entitled "MOBILE NETWORK PLATFORM FOR EDUCATION, ENTERTAINMENT, AND SECURITY," the entire disclosure of which is hereby incorporated by reference in its entirety.

BACKGROUND

This application relates generally to communication and media consumption devices. More specifically, this application relates to a mobile network platform for education and entertainment which may provide advantageous means for monitoring, measuring and updating media content items.

SUMMARY

Electronic devices today used, for example, by children often provide little opportunity for improved and improving entertainment and/or educational benefit. For example, when a child begins to learn a game, use educational software, and/or view various content they may experience a steep learning curve. But, over time the rate of learning, or other benefit may taper off, or become flat.

Therefore, there is a significant need for a system wherein learning, or other benefit may be better managed. There is also a significant need to monitor the use of some devices, and the consumption of various content for better safety and for increased benefit. There is also a significant need to measure content consumption, and/or to receive suggestions, as how the content may be varied and/or upgraded and/or changed.

This application discloses a system which may be at least partially enabled by one or more processors, and may include a first device having a display for displaying a selected content item made accessible to the first device via download and/or streaming from a network. The first device may have a first device input to interact with the content item. A second device may be coupled to the network and may be configured to control access to and/or to monitor the use of the content item by the first device. A heuristics module may be included for determining whether the first device has utilized the content item to a level of utilization greater than a predetermined value and to form a suggestion based on the determination made by the heuristics module. A communication module may be included to send the suggestion to the second device to provide the first device with an updated and/or a second content item.

BRIEF DESCRIPTION OF THE DRAWINGS

The drawings, when considered in connection with the following description, are presented for the purpose of facilitating an understanding of the subject matter sought to be protected.

DETAILED DESCRIPTION

While the system is described with reference to several illustrative embodiments described herein, it should be clear that the present invention should not be limited to such embodiments. Therefore, the description of the embodiments provided herein is illustrative of the present invention and should not limit the scope of the invention. In addition, while the following description references drawings showing particular configurations and proportions, it will be appreciated that the invention may be configured to have other configurations and proportions.

The description may use perspective-based descriptions such as up/down, back/front, and top/bottom. Such descriptions are merely used to facilitate the discussion and are not intended to restrict the application of embodiments of the present invention.

Figure 1:
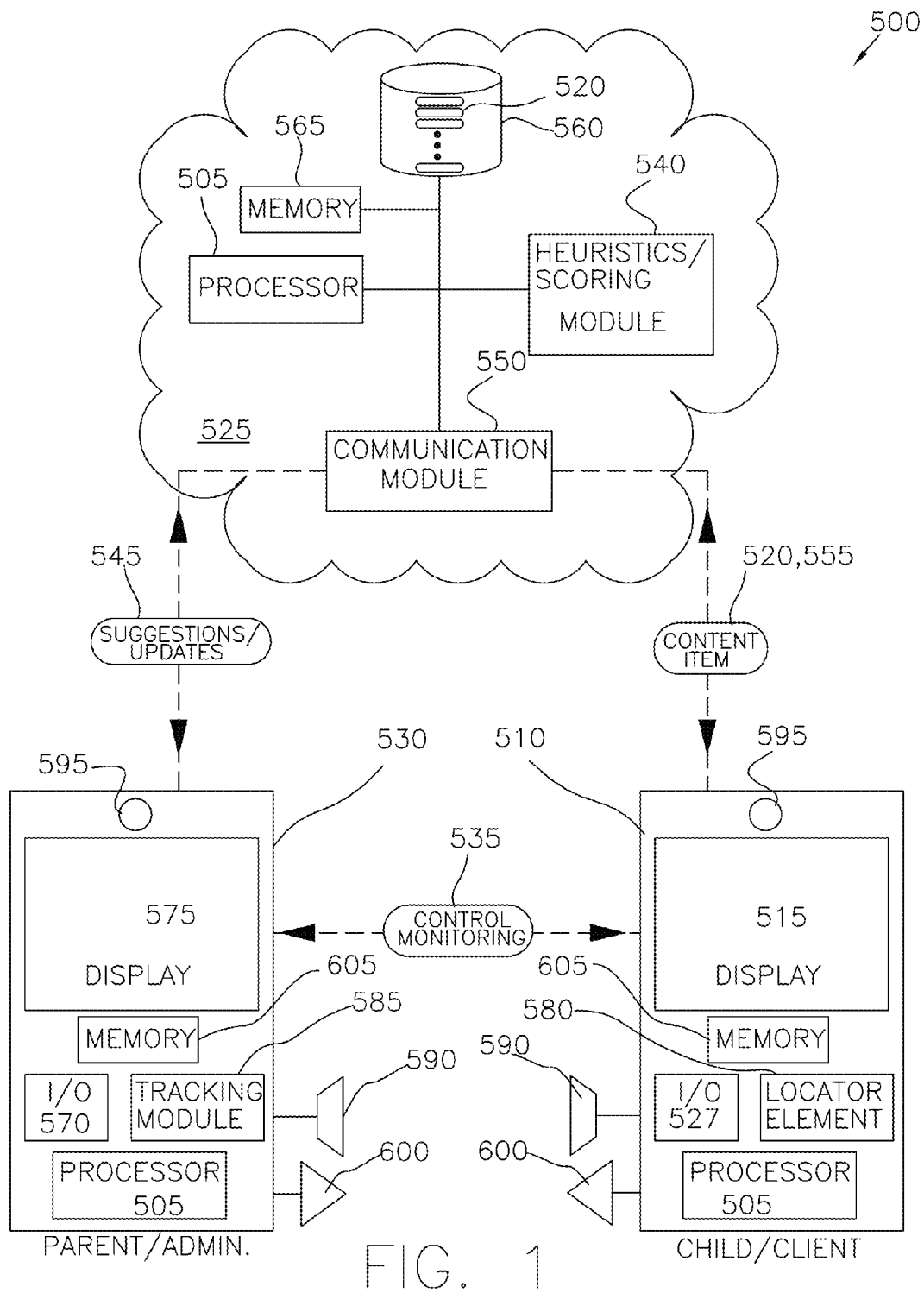
FIG. 1 is a schematic view illustrating an example system accordance with various embodiments.
Figure 2:
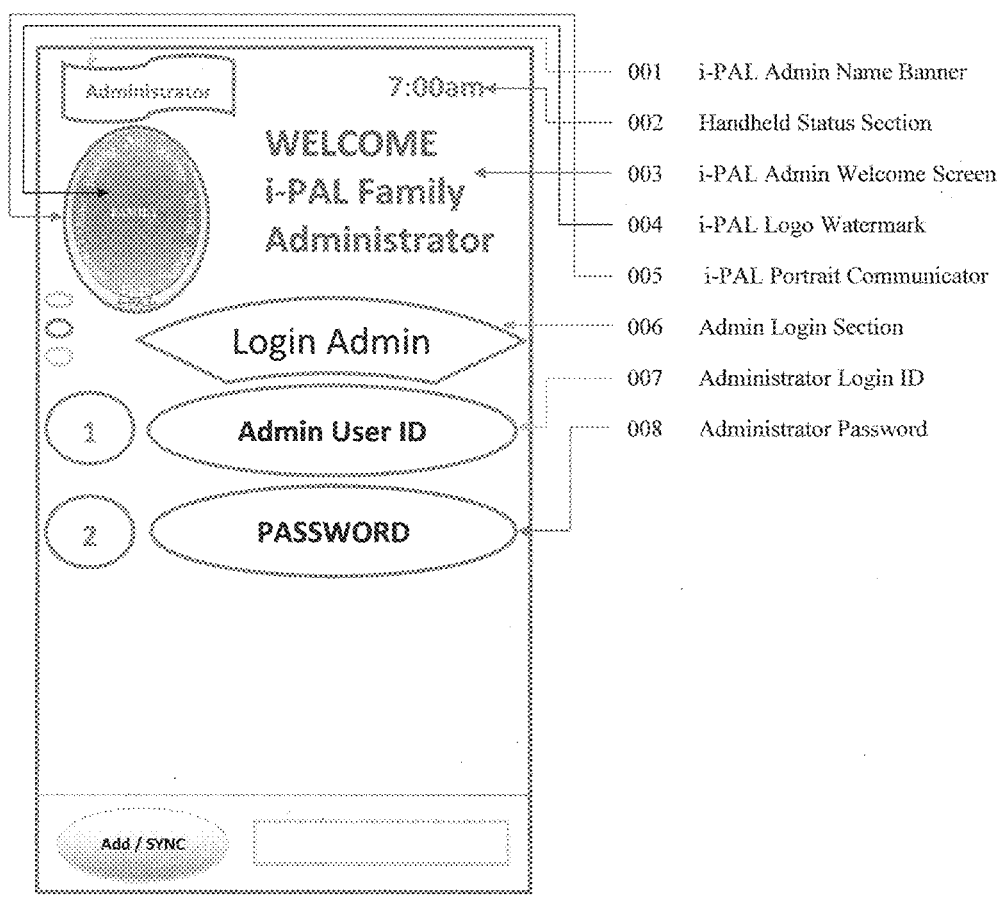
FIG. 2 is a schematic front view illustrating an example administrator login screen usable by a first user acting as an administrator who may be, for example, a parent or guardian of second user in accordance with various embodiments.
Figure 3:
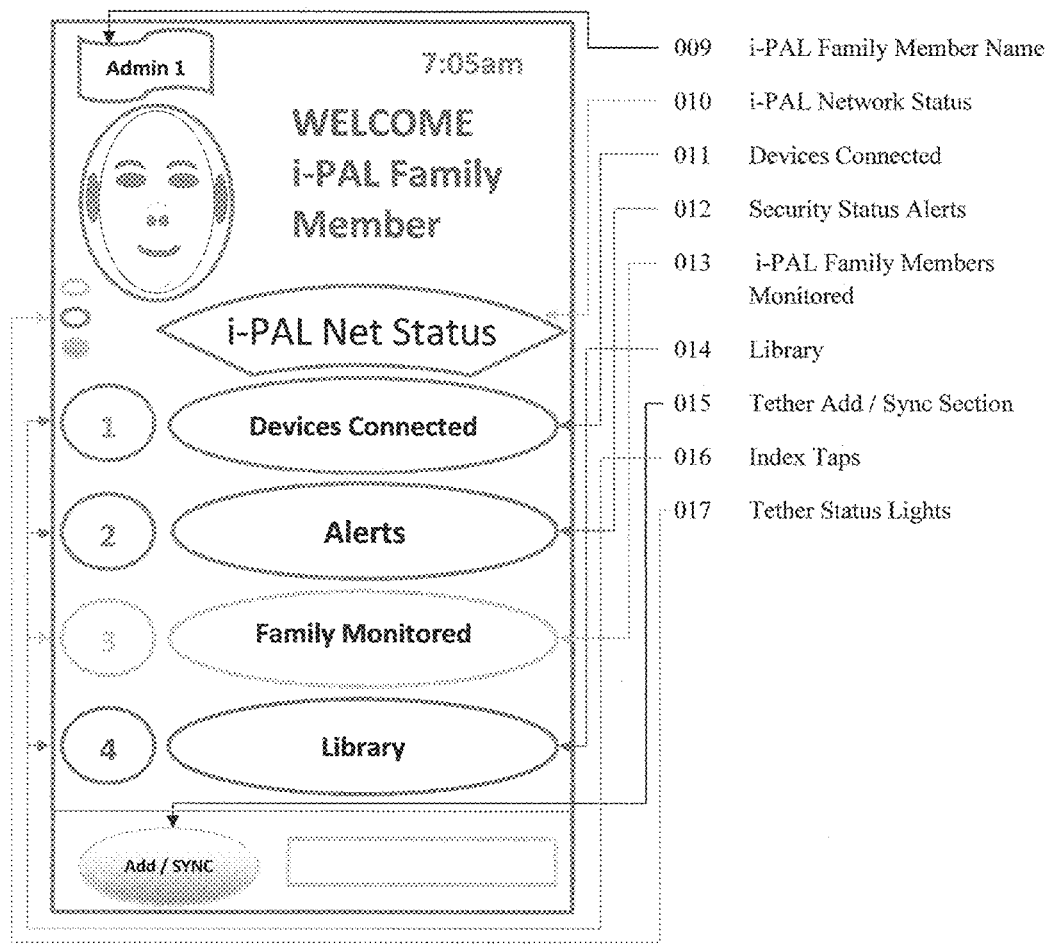
FIG. 3 is a schematic front view illustrating an example network status screen of the administrator/parent interface in accordance with various embodiments.
Figure 4:
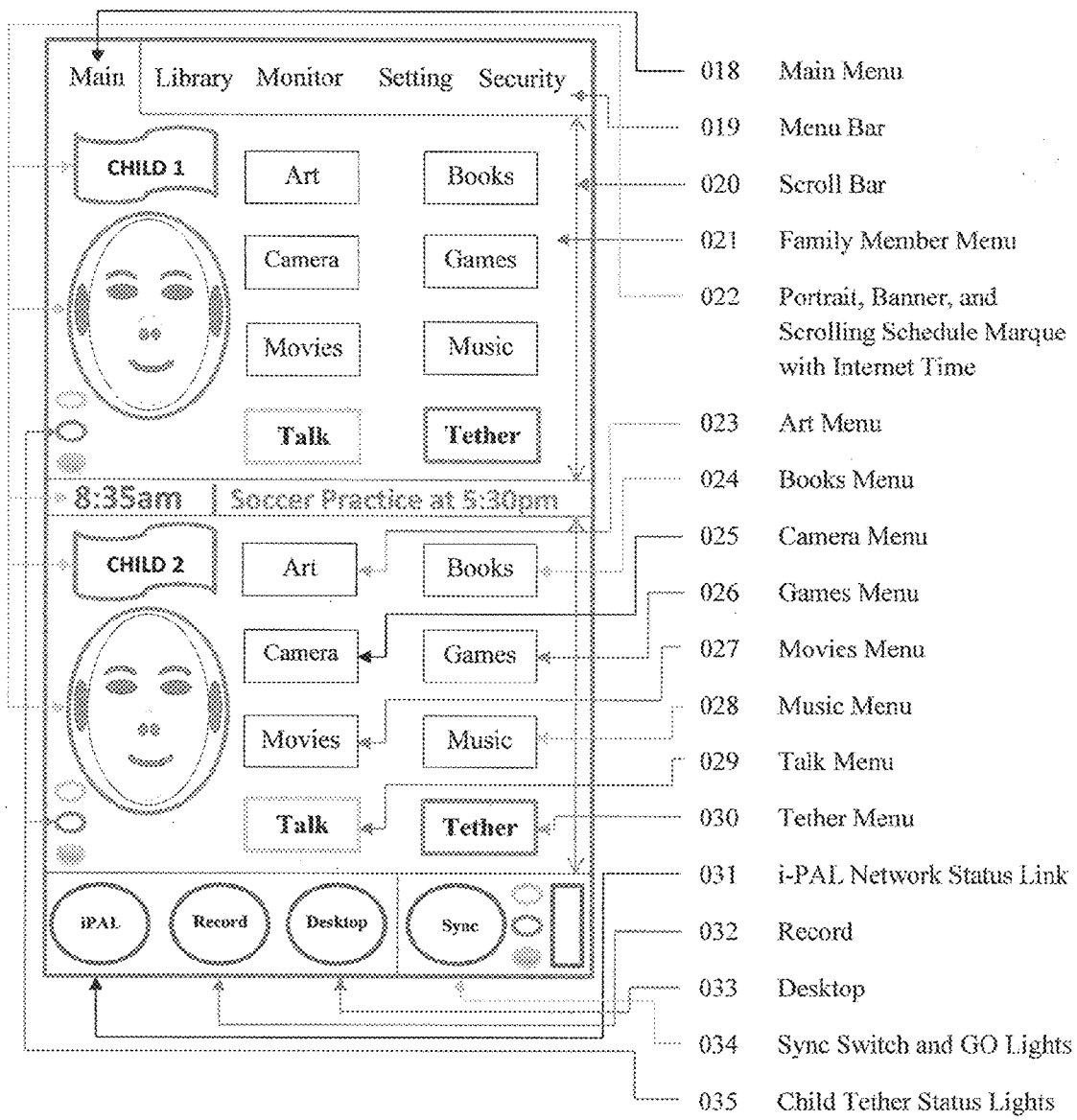
FIG. 4 is a schematic front view illustrating an example administrative main menu screen for an administrator within a network or platform in accordance with various embodiments.
Figure 5:
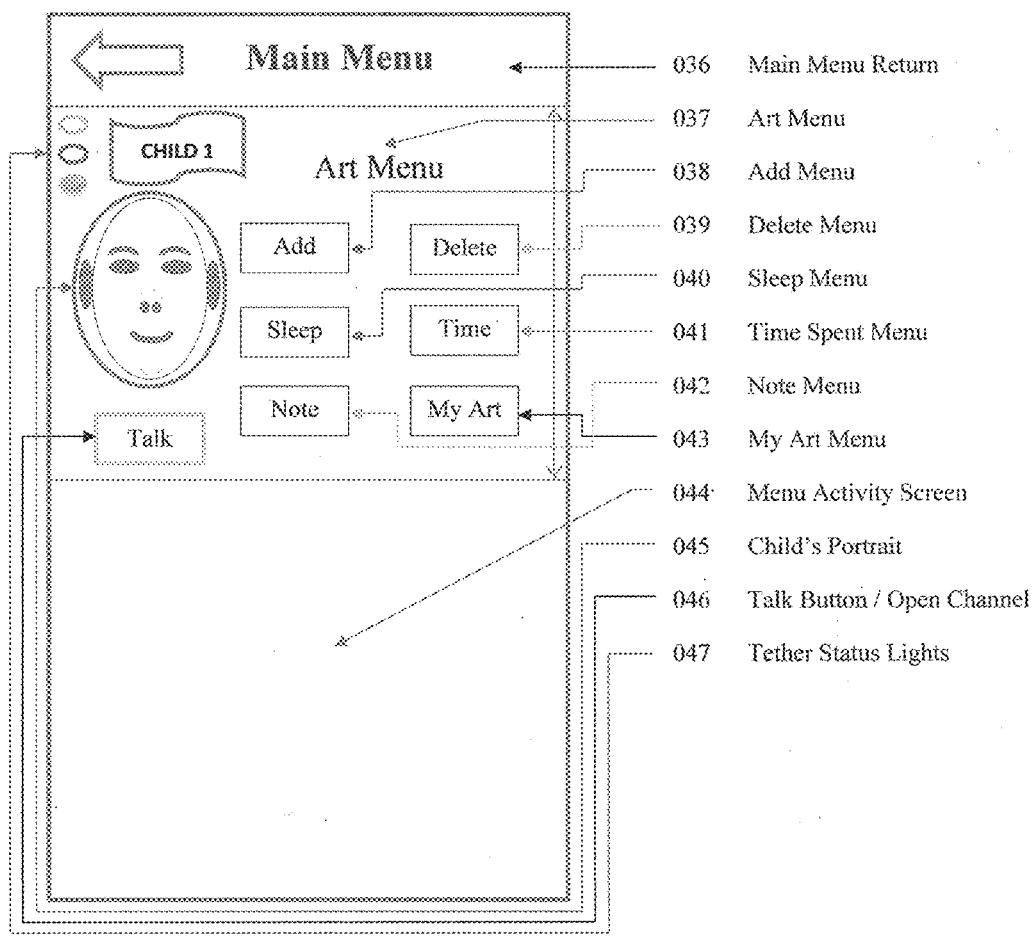
FIG. 5 is a schematic front view illustrating an example art menu image of a second user, such as a child and/or other the family member, and the like, managed by the administrator/parent in accordance with various embodiments.
Figure 6:
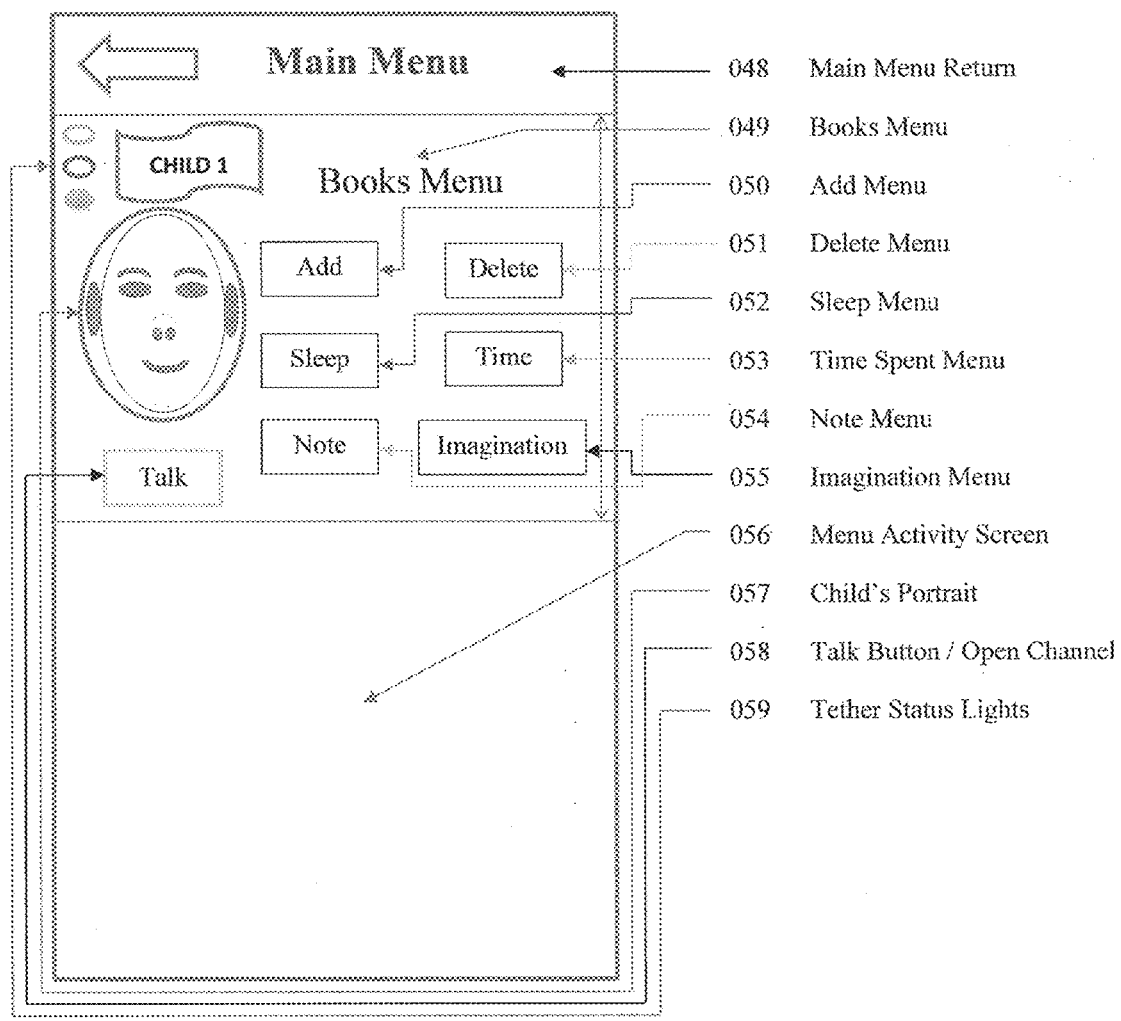
FIG. 6 is a schematic front view illustrating an example books menu image of the second user in accordance with various embodiments.
Figure 7:
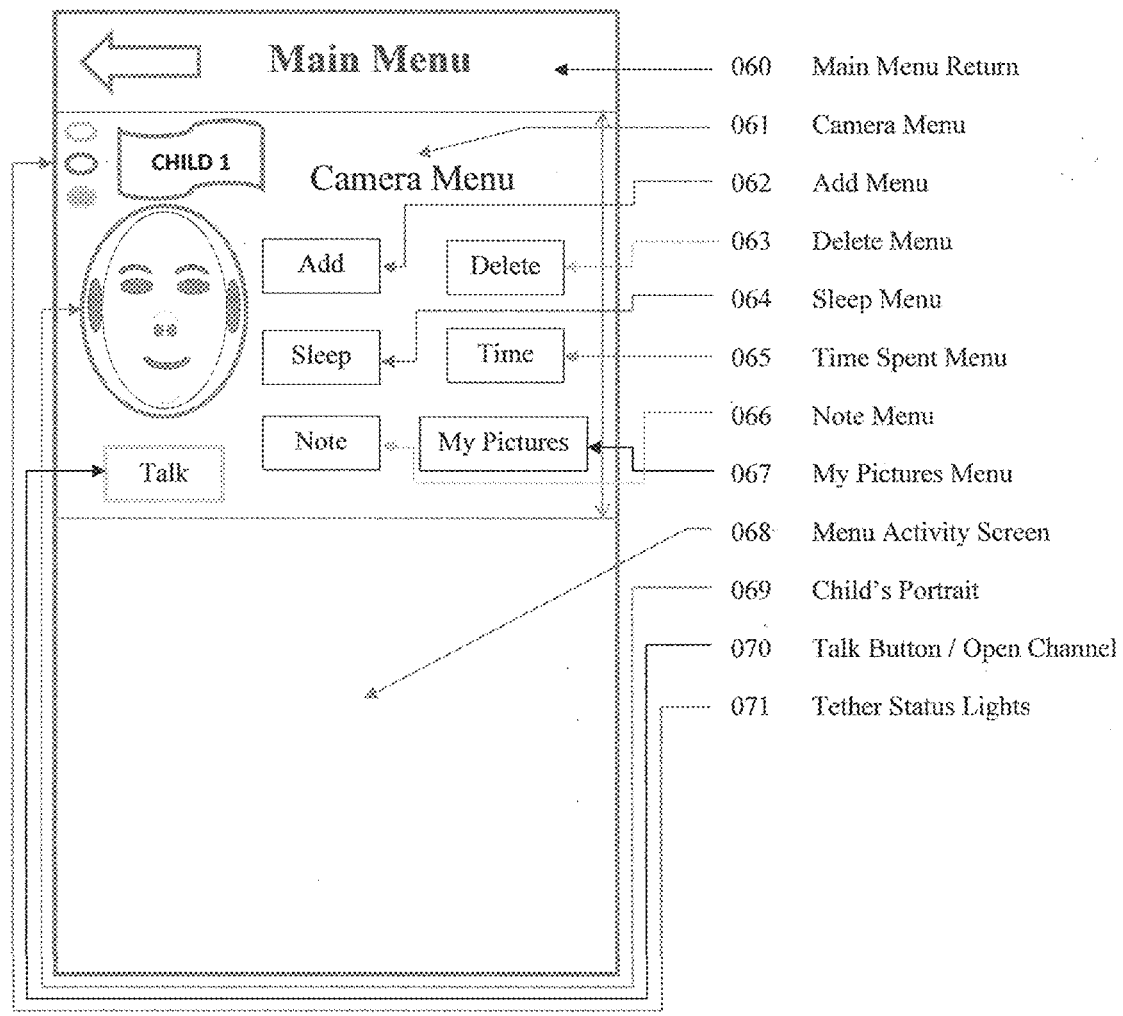
FIG. 7 is a schematic front view illustrating an example camera menu of the family member managed by the admin/parent in accordance with various embodiments.
Figure 8:
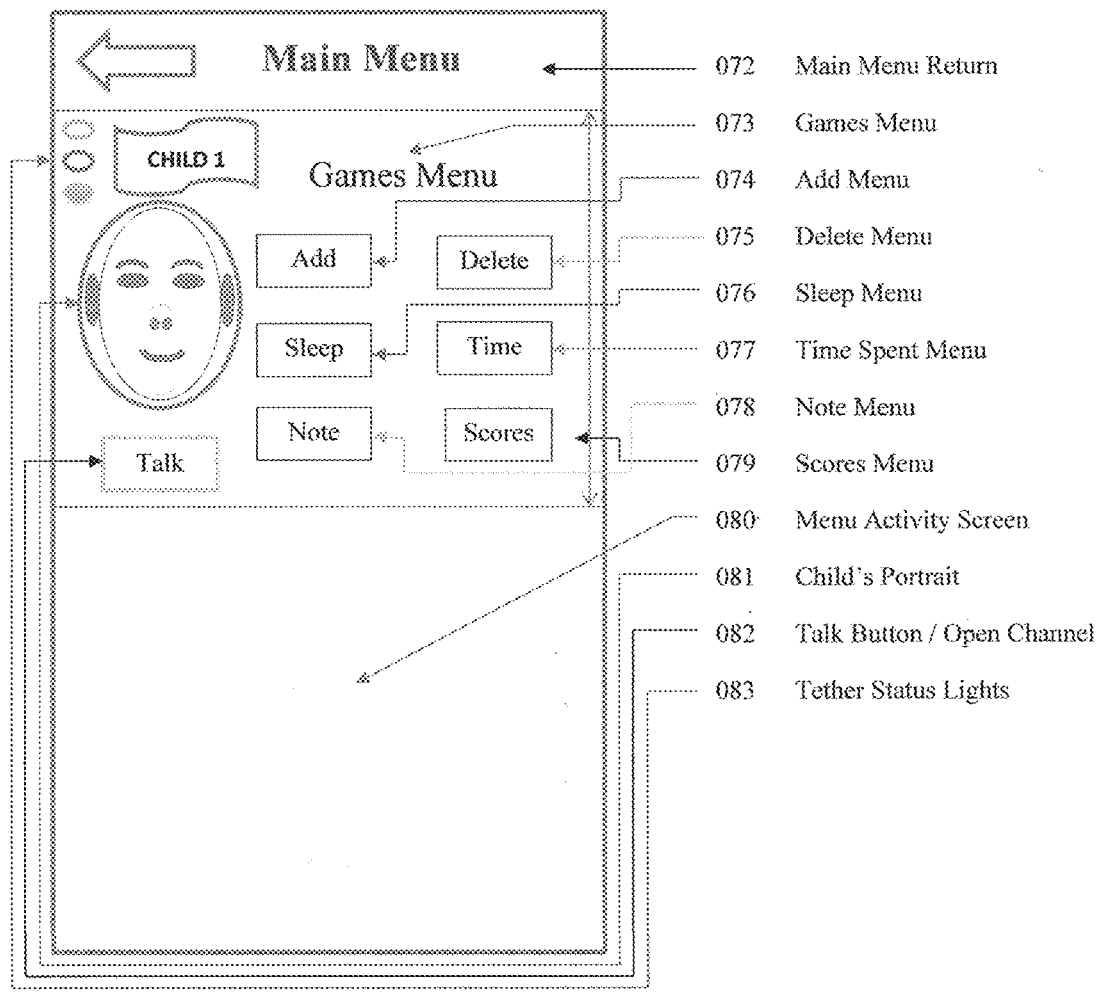
FIG. 8 is a schematic front view illustrating an example games menu of, for example, a family member managed by the admin/parent in accordance with various embodiments.
Figure 9:
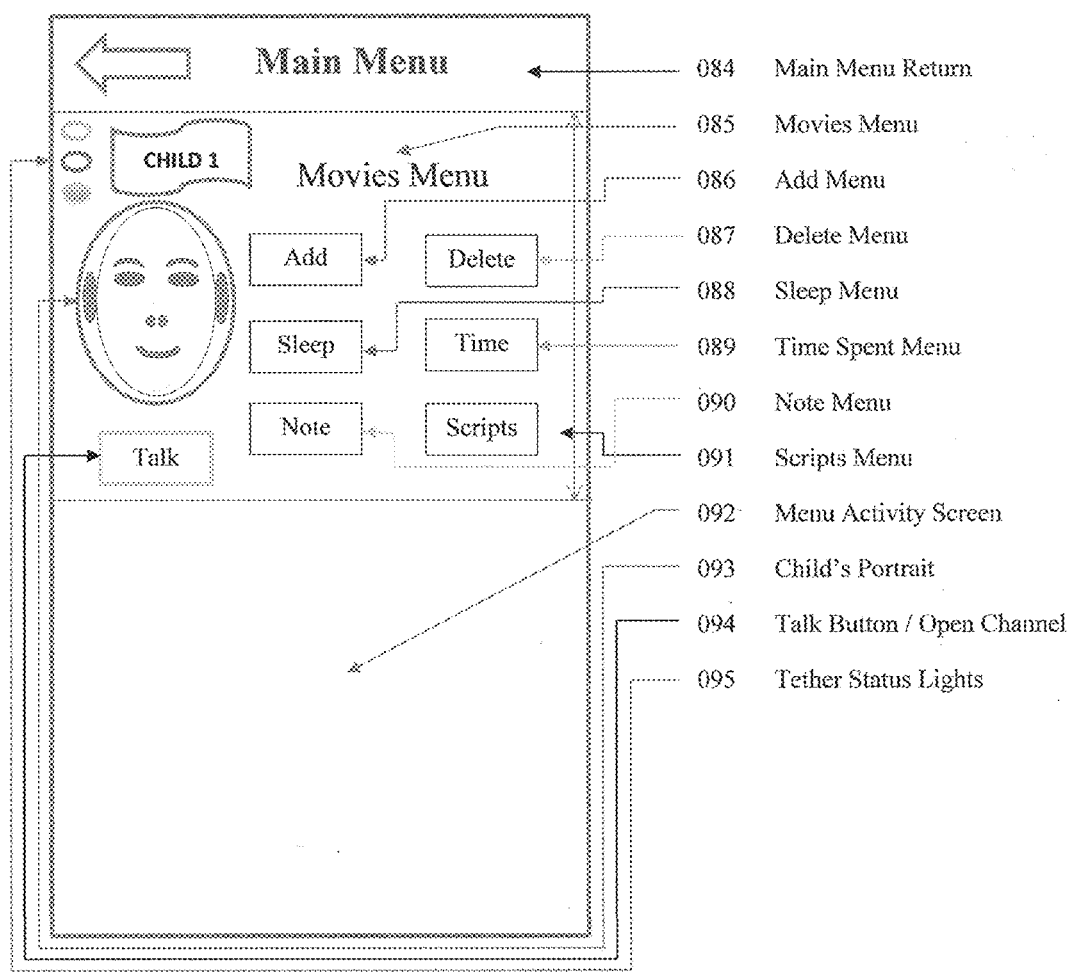
FIG. 9 is a schematic front view illustrating an example movies menu of the family member managed by the admin/parent in accordance with various embodiments.
Figure 10:
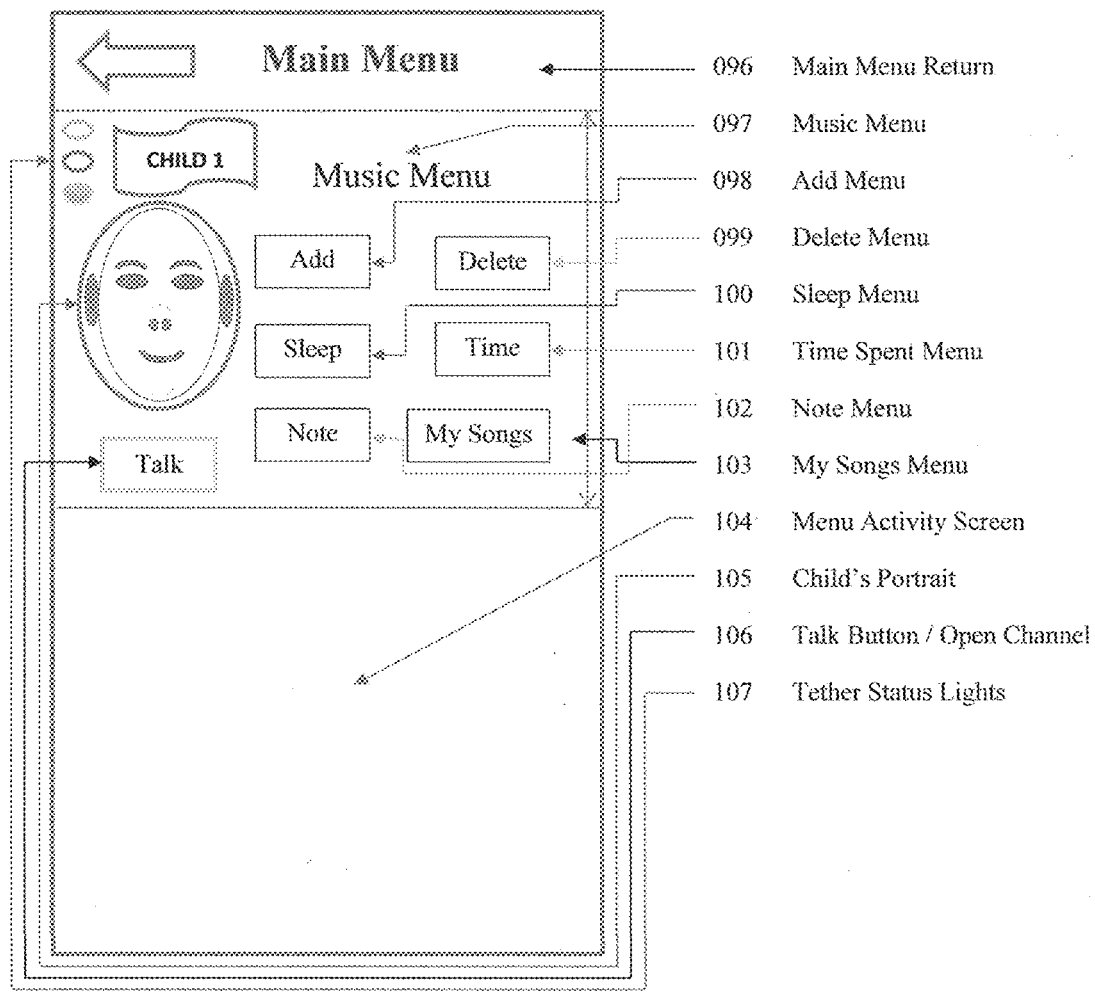
FIG. 10 is a schematic front view illustrating an example music menu of the family member managed by the admin/parent in accordance with various embodiments.
Figure 11:
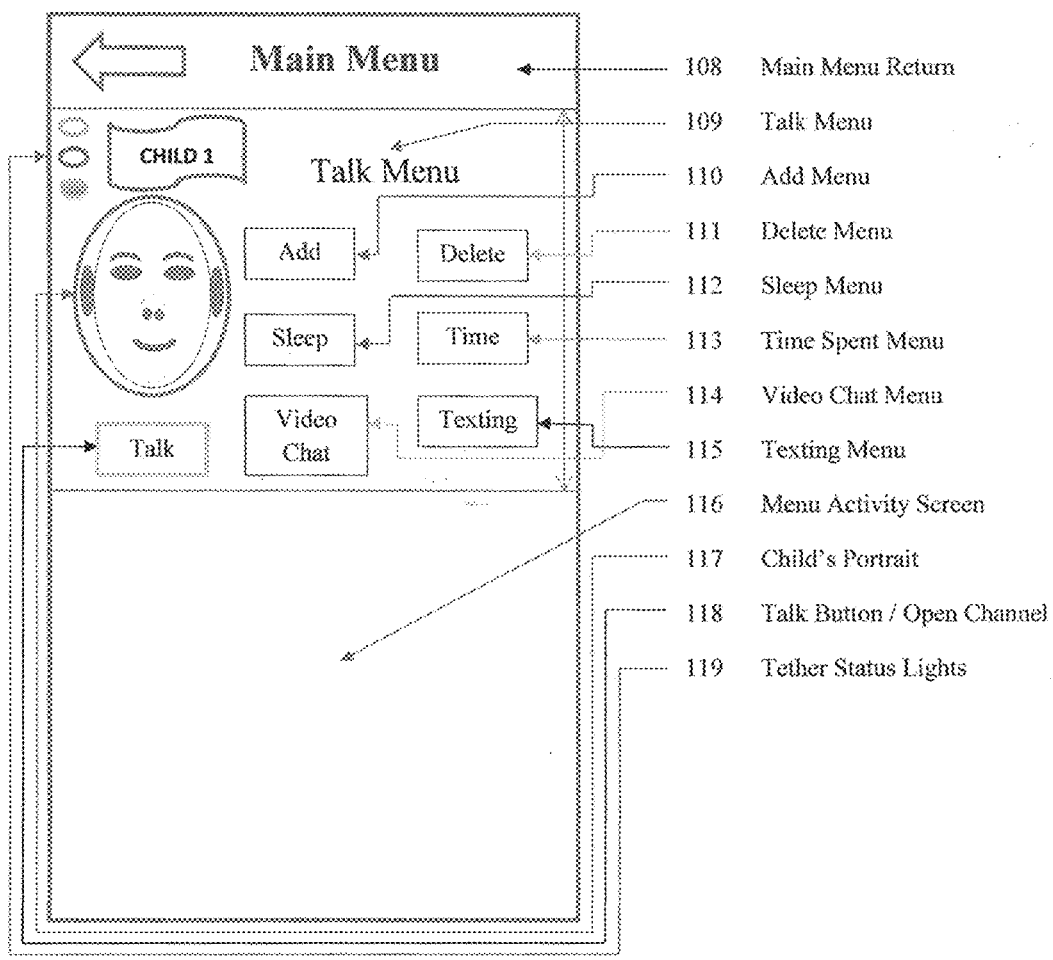
FIG. 11 is a schematic front view illustrating an example talk menu of the family member managed by the admin/parent in accordance with various embodiments.
Figure 12:
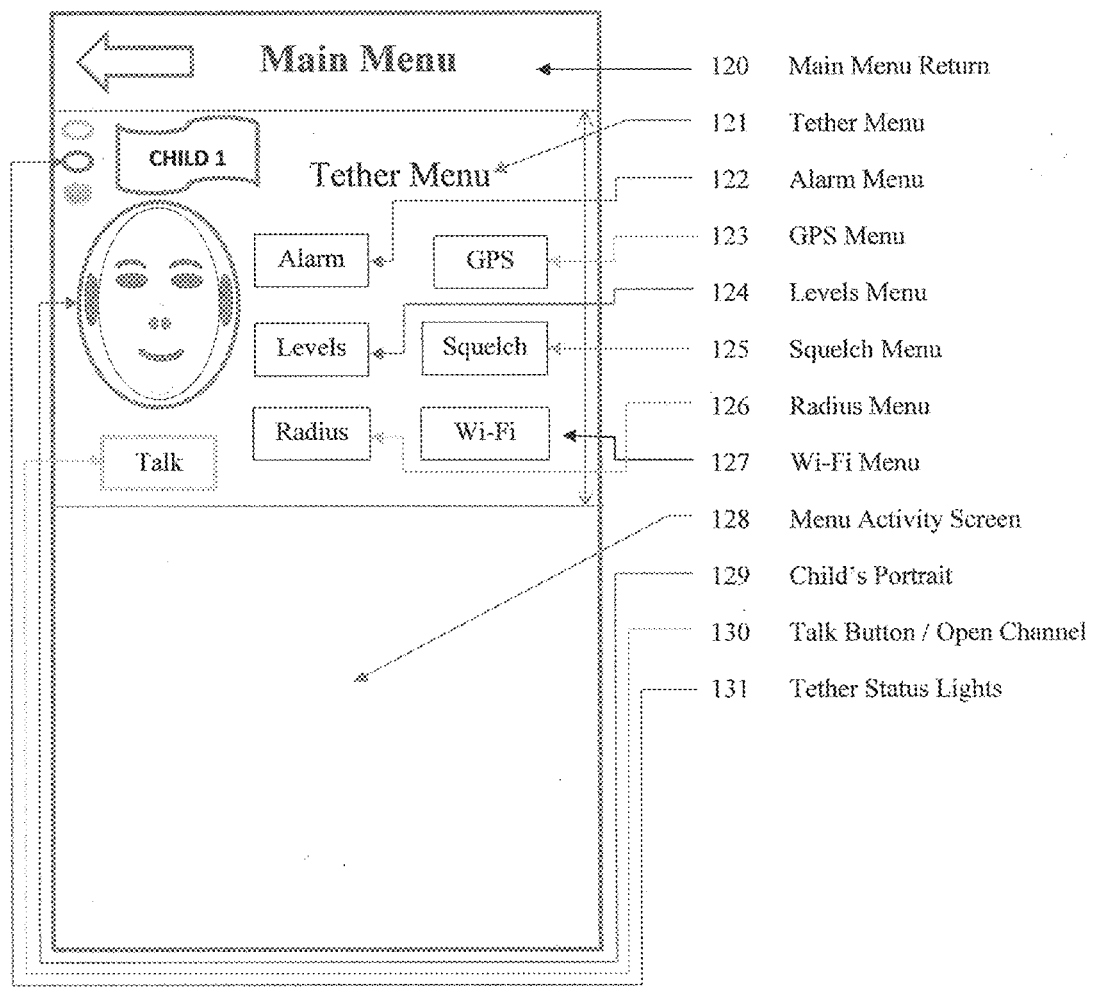
FIG. 12 is a schematic front view illustrating an example tether menu of the family member managed by the admin/parent in accordance with various embodiments.
Figure 13:
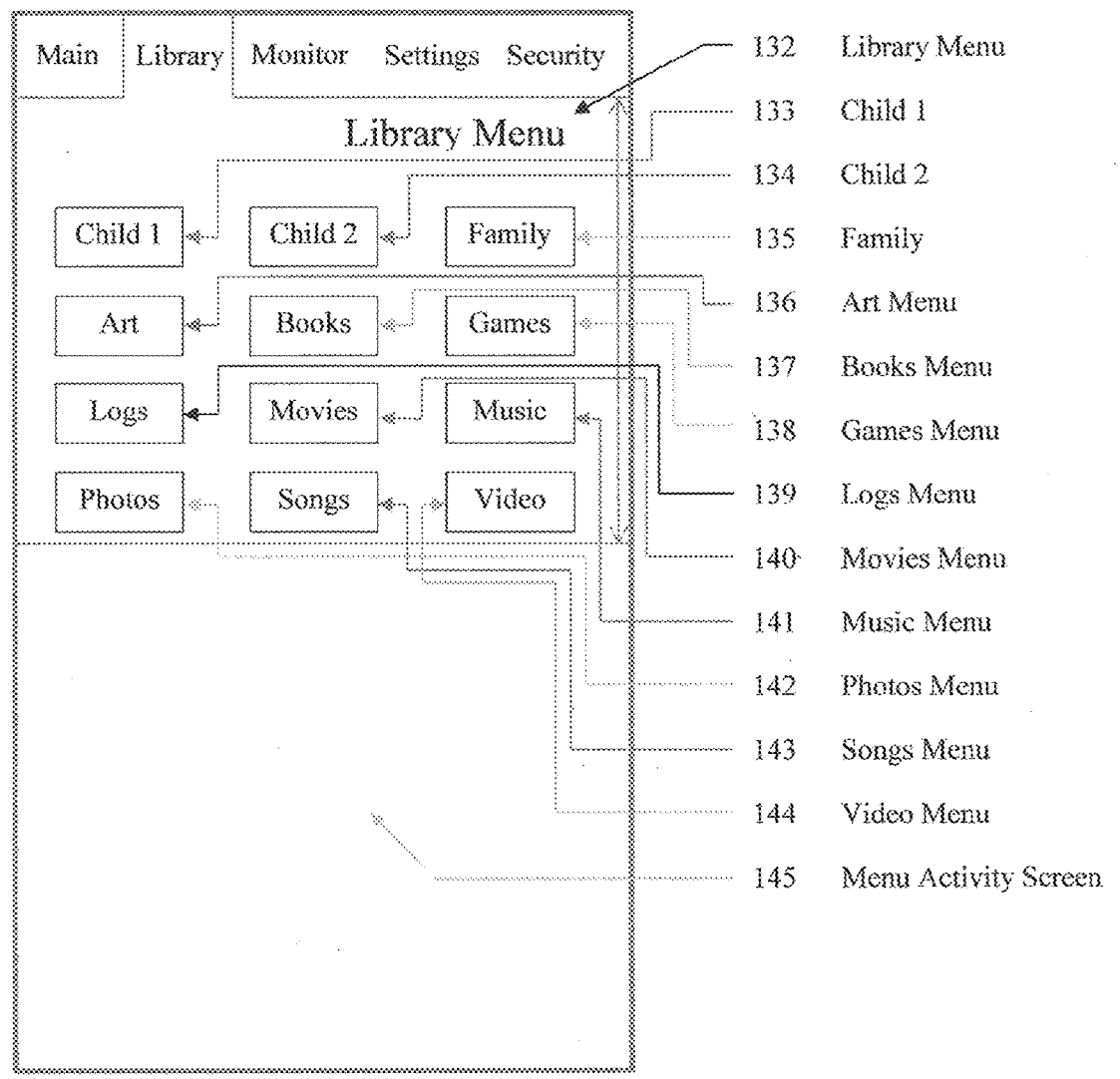
FIG. 13 is a schematic front view illustrating a first example library menu of the admin/parent interface in accordance with various embodiments.
Figure 14:
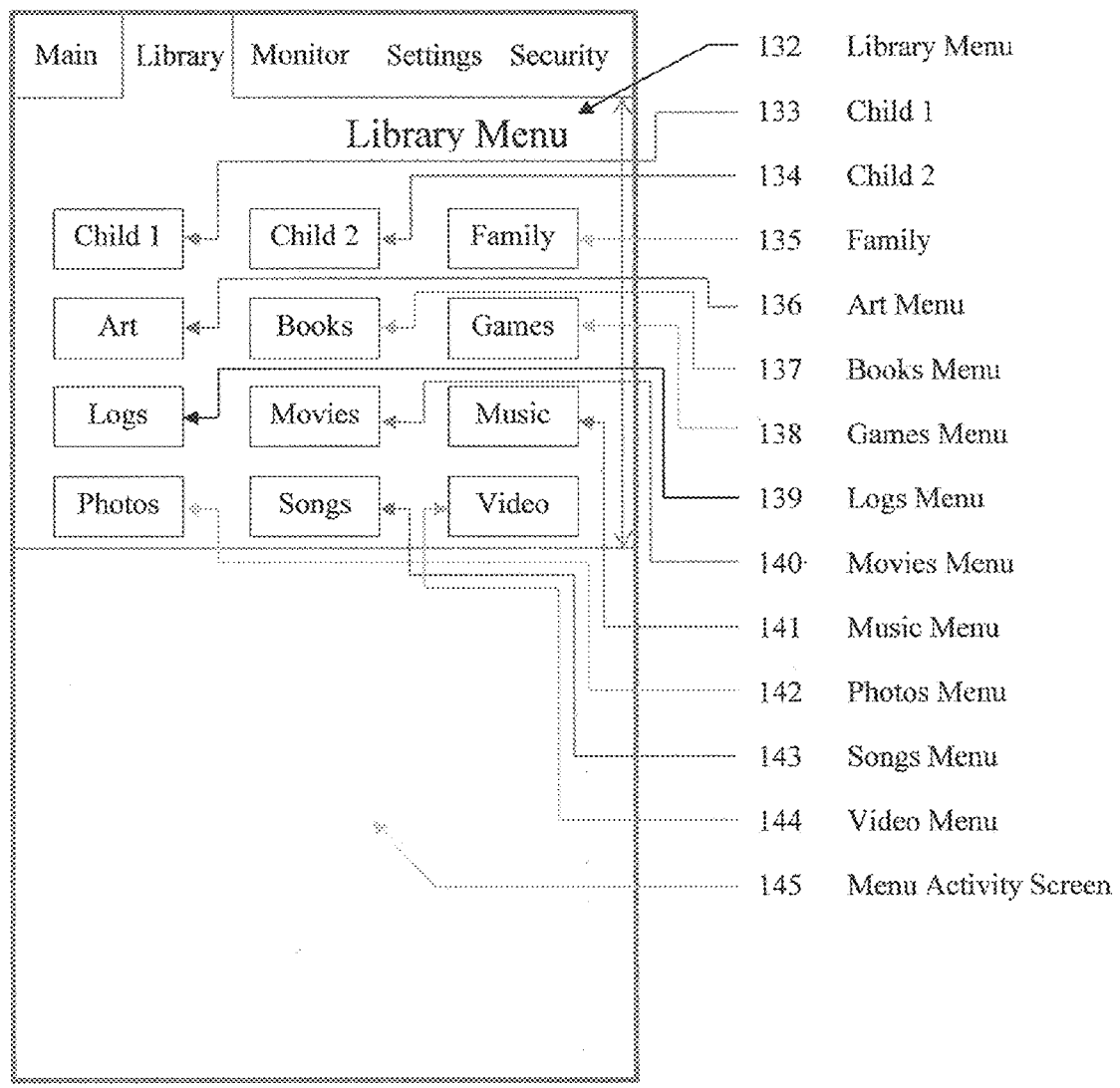
FIG. 14 is another schematic front view illustrating an example library menu of the admin\parent interface in accordance with various embodiments.
Figure 15:
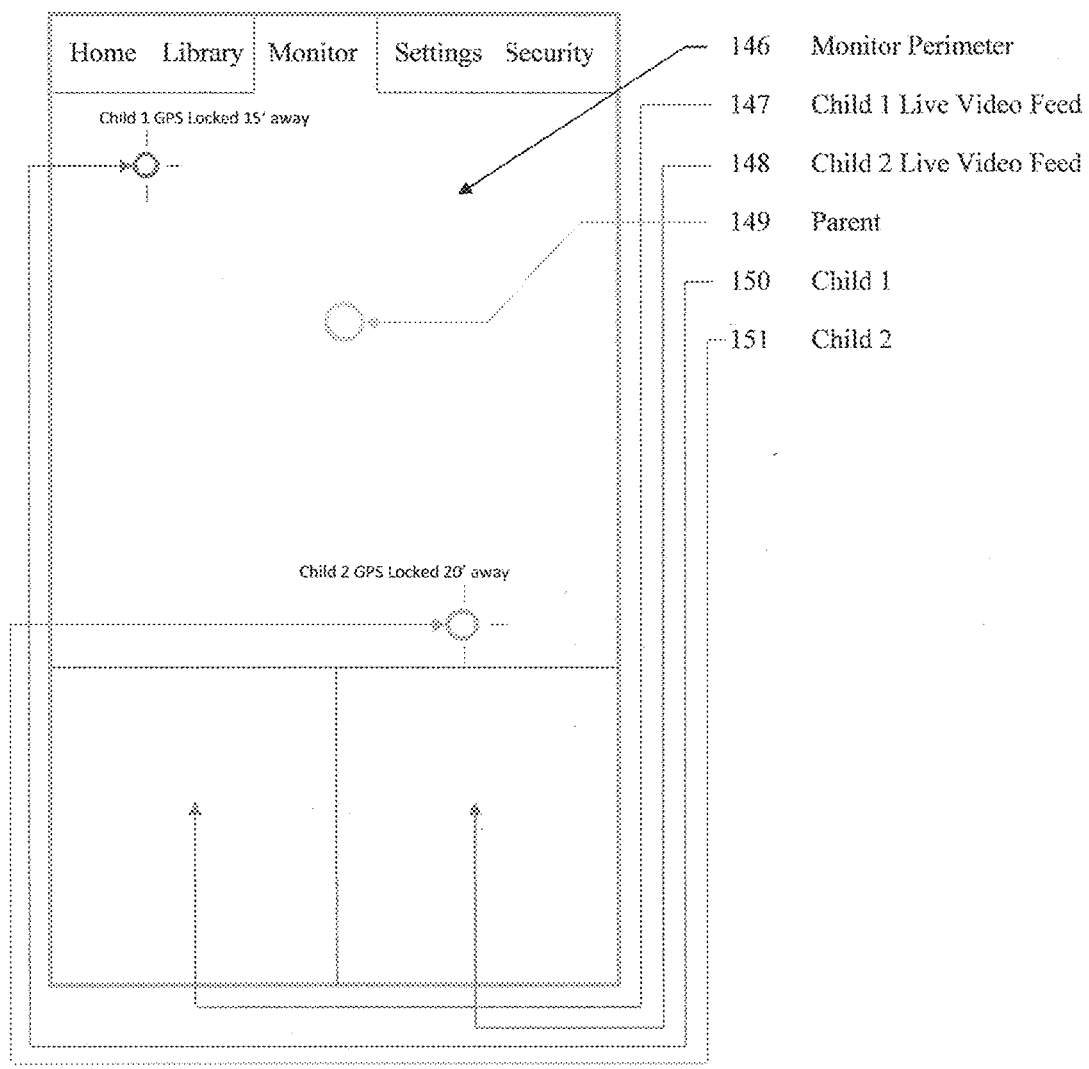
FIG. 15 is a schematic front view illustrating an example monitor menu of the admin\parent interface in accordance with various embodiments.
Figure 16:
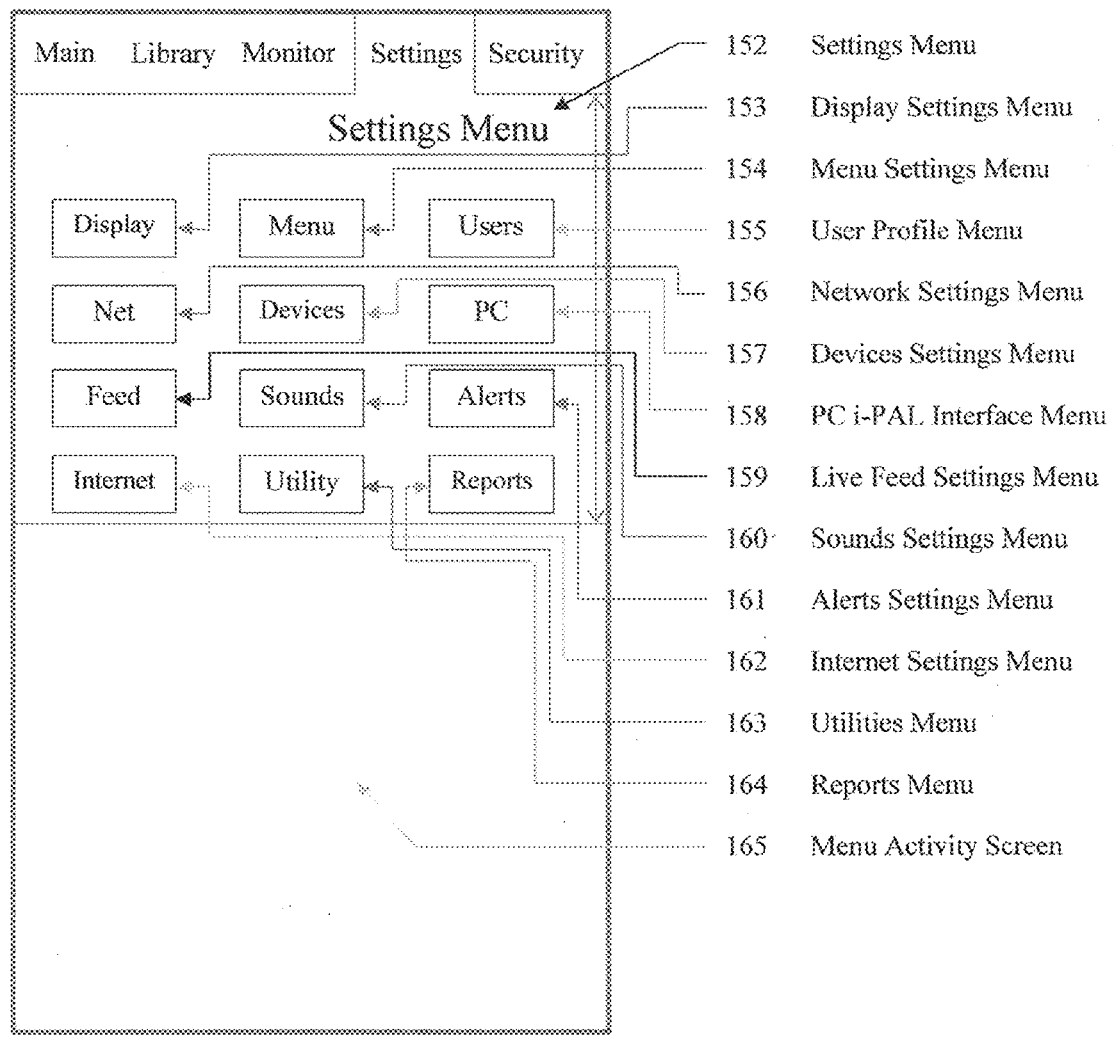
FIG. 16 is a schematic front view illustrating a first example settings menu of the admin\parent interface in accordance with various embodiments.
Figure 17:
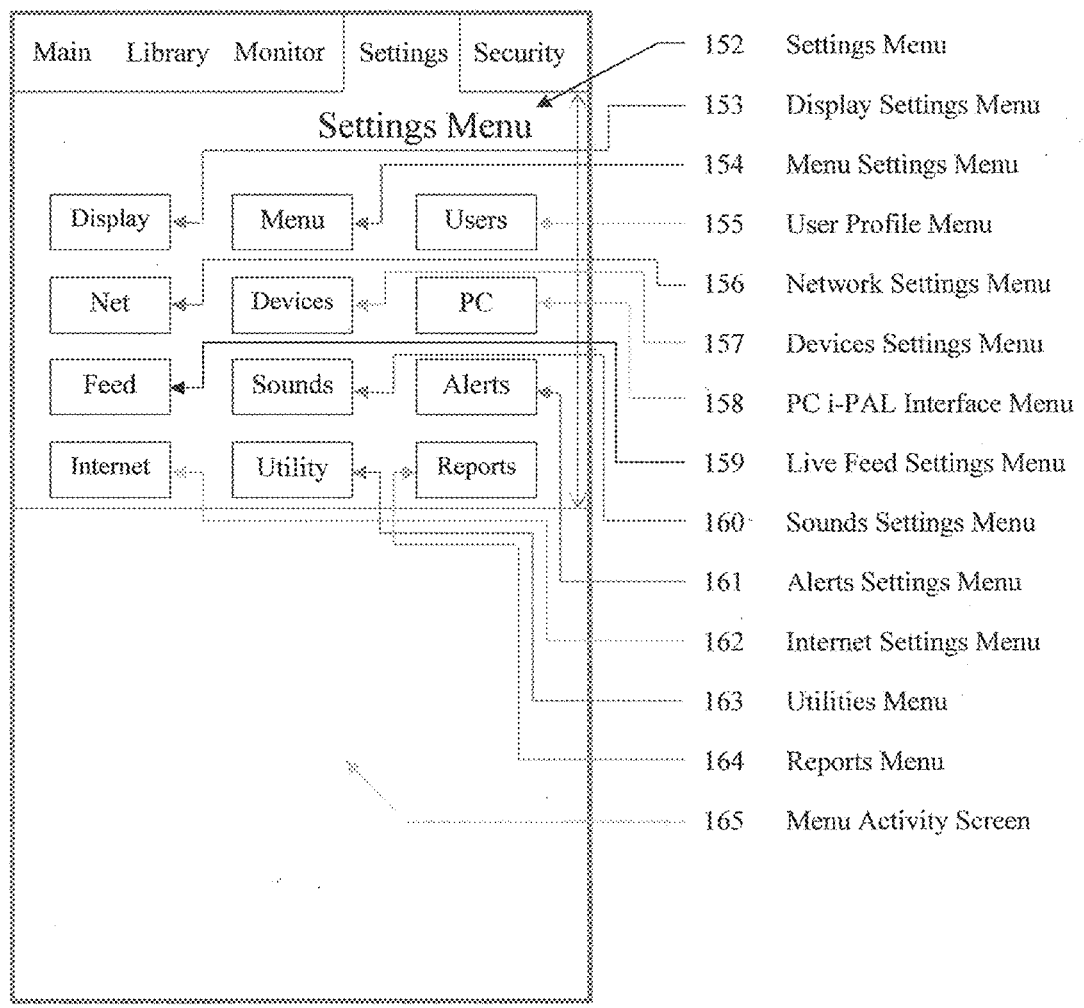
FIG. 17 is a schematic front view illustrating another example settings menu of the admin\parent interface in accordance with various embodiments.
Figure 18:
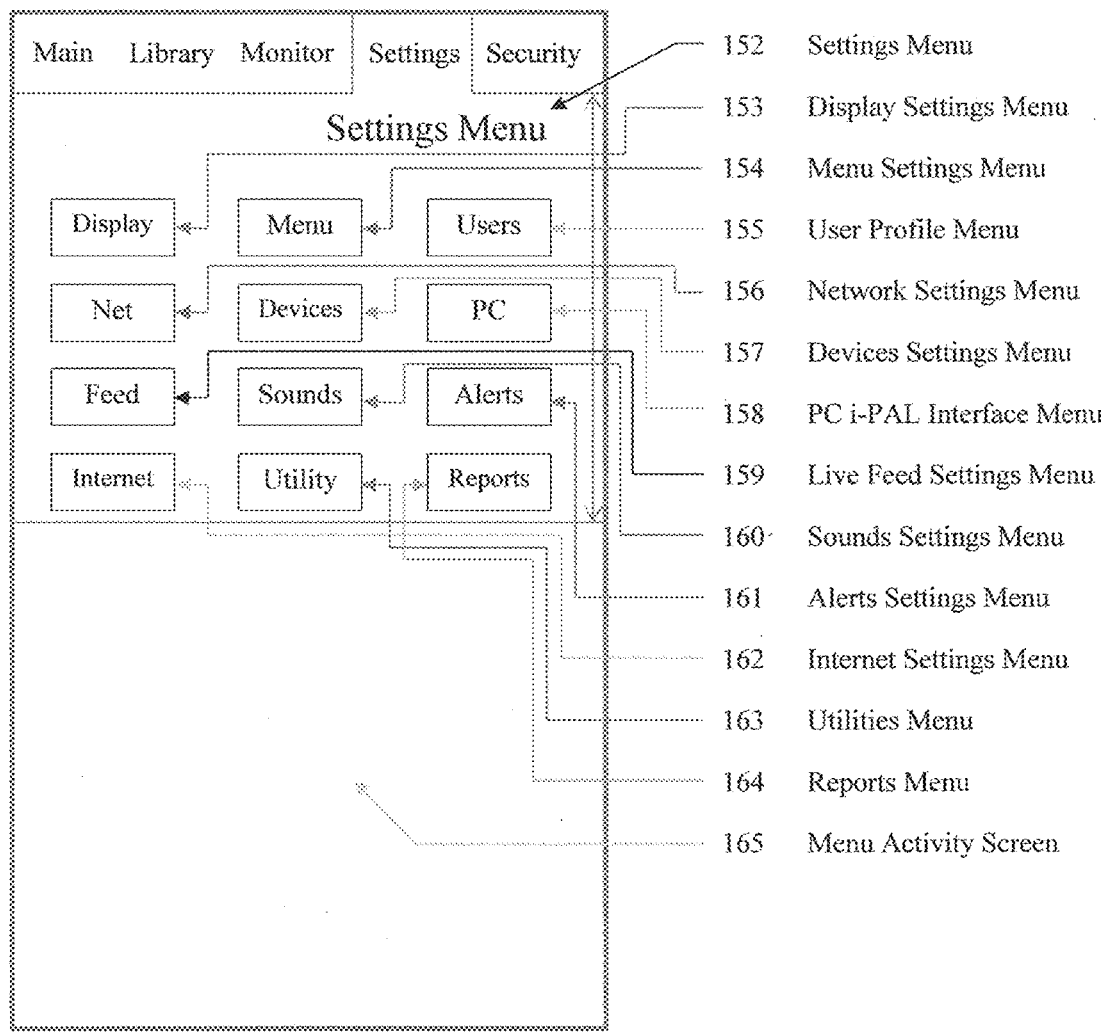
FIG. 18 is a schematic front view illustrating another example settings menu of the admin\parent interface in accordance with various embodiments.
Figure 19:
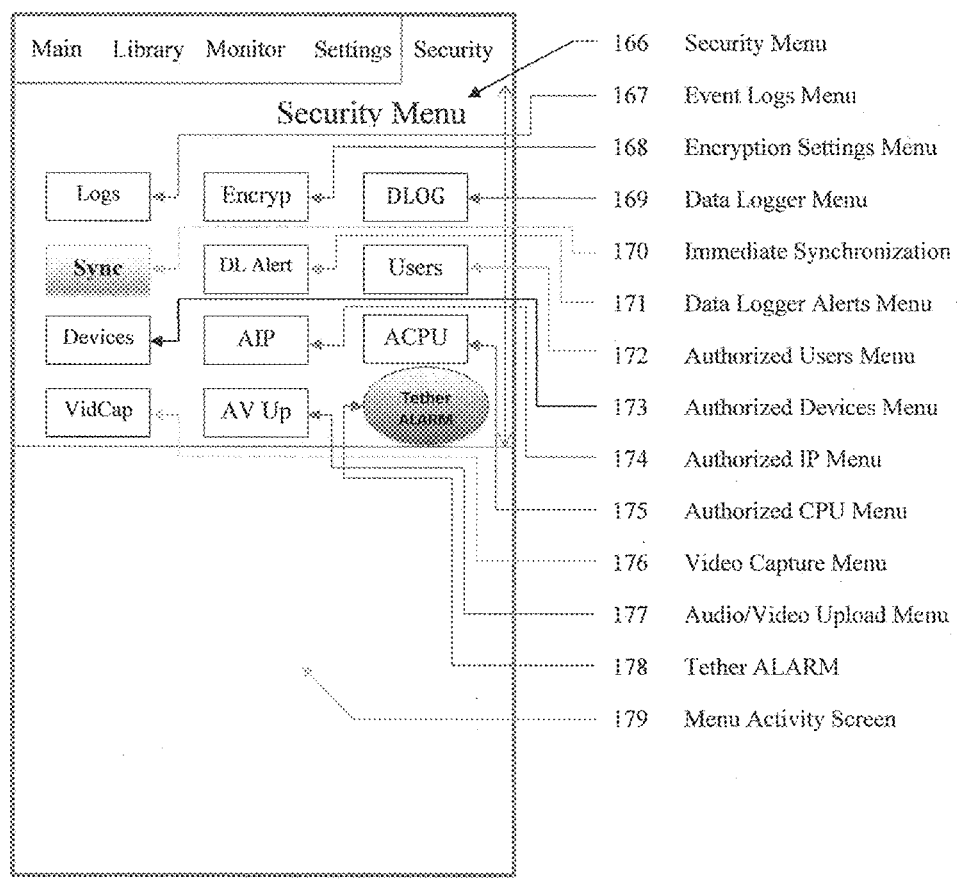
FIG. 19 is a schematic front view illustrating an example security menu of the admin\parent interface in accordance with various embodiments.
Figure 20:
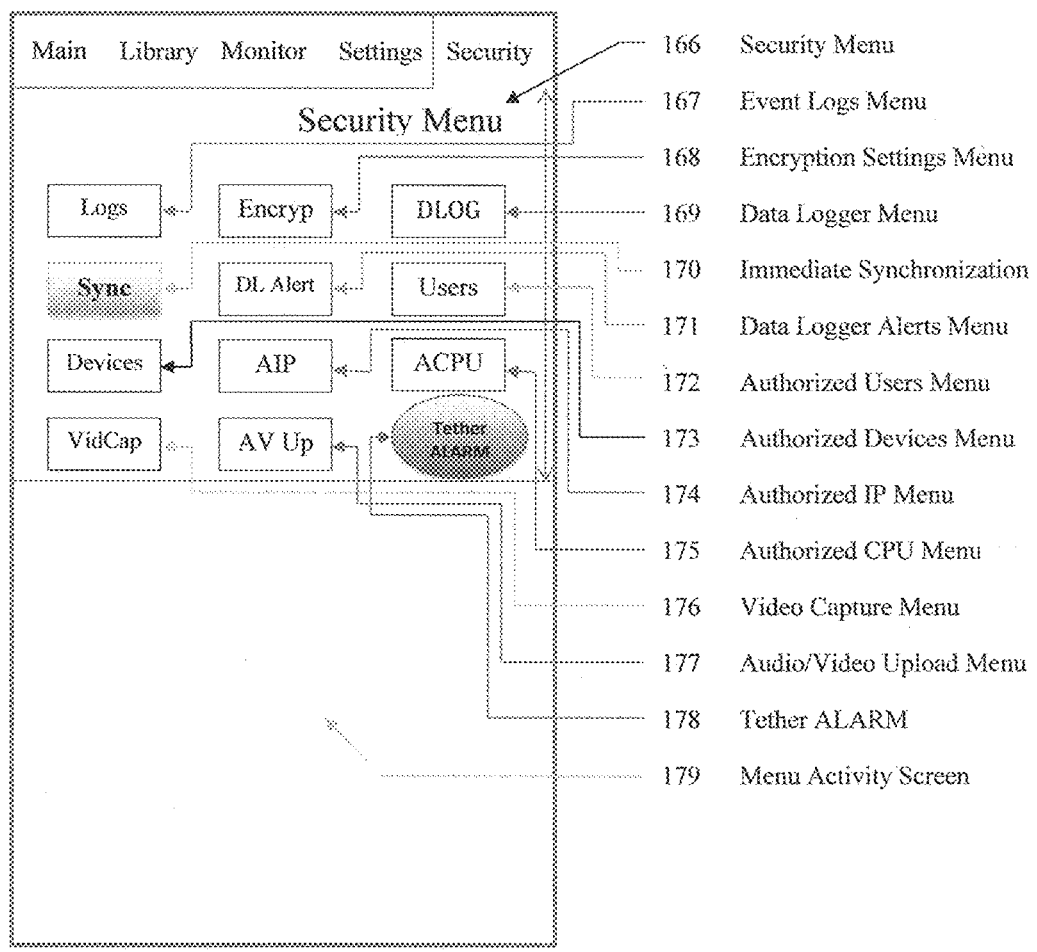
FIG. 20 is a schematic front view illustrating another example security menu of the admin\parent interface in accordance with various embodiments.
Figure 21:
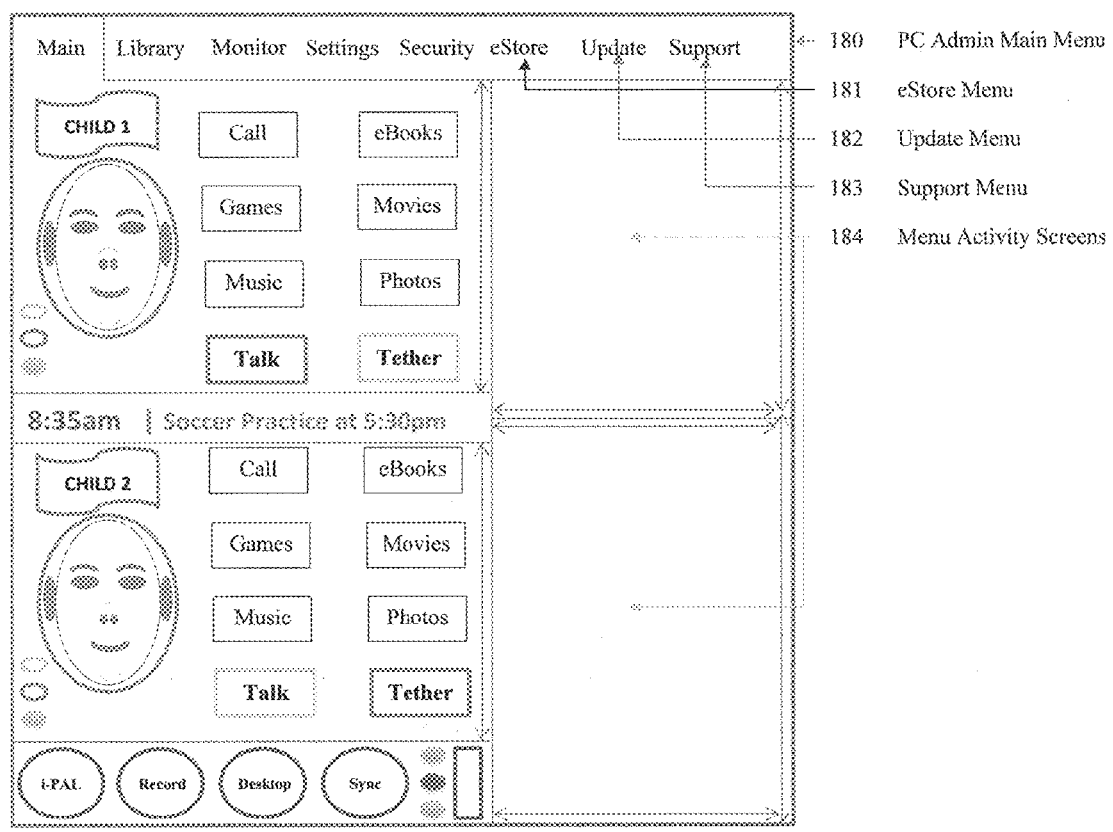
FIG. 21 is a schematic front view illustrating an example personal computer main menu of the admin\parent interface in accordance with various embodiments.
Figure 22:
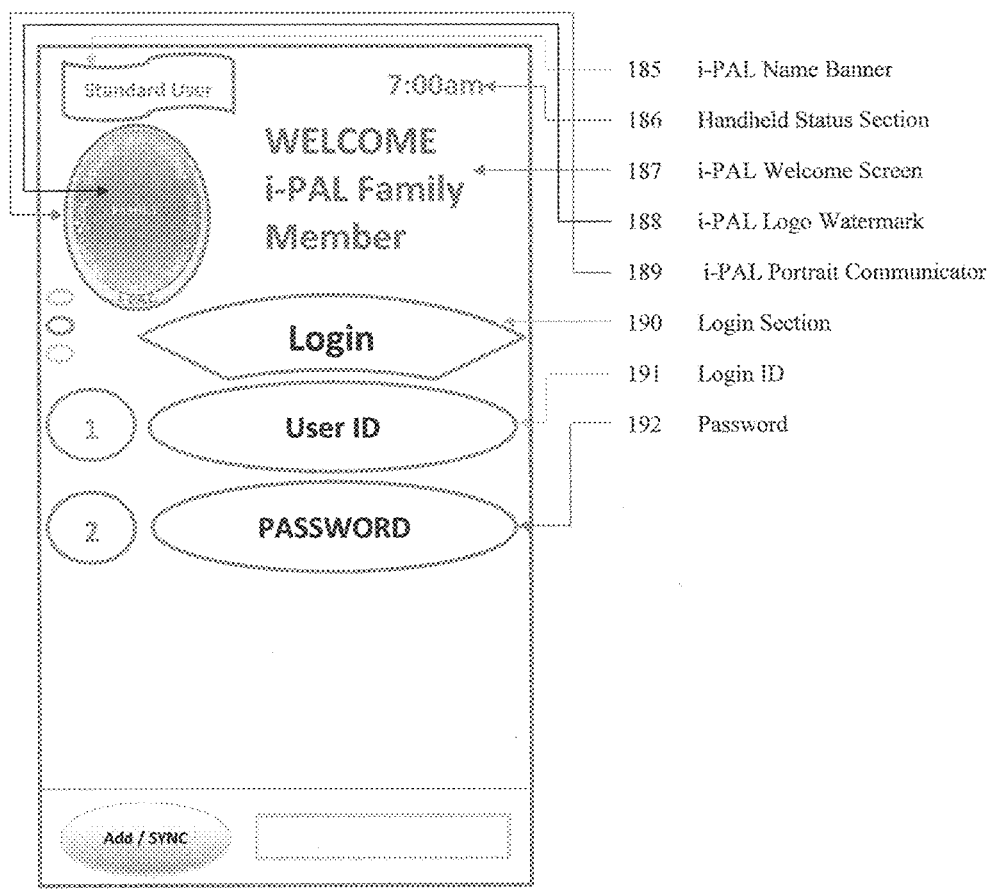
FIG. 22 is a schematic front view illustrating an example login screen of the family members interface for a second user, for example a standard user, for example a child, in accordance with various embodiments.
Figure 23:
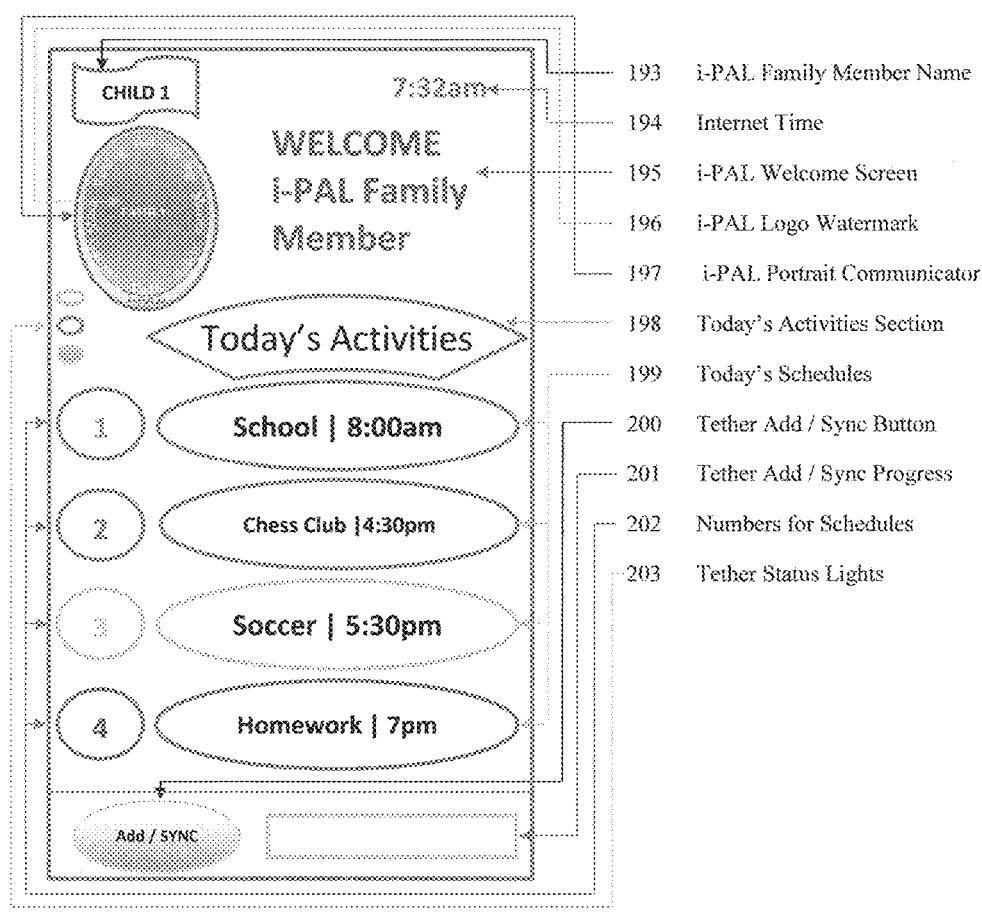
FIG. 23 is a schematic front view illustrating an example activity screen of the family members interface for standard user in accordance with various embodiments.
Figure 24:
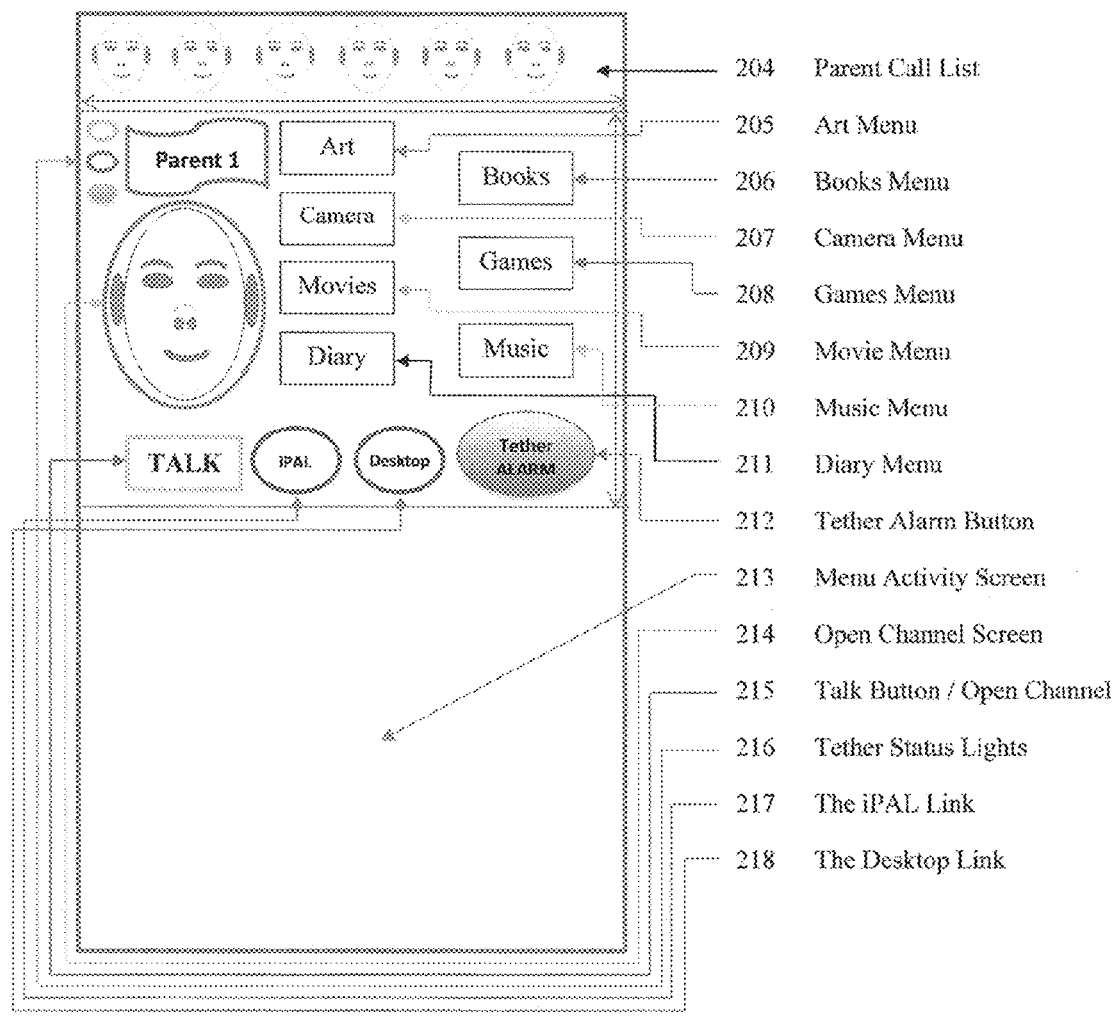
FIG. 24 is a schematic front view illustrating an example main menu of the parent interface for standard user in accordance with various embodiments.
Figure 25:
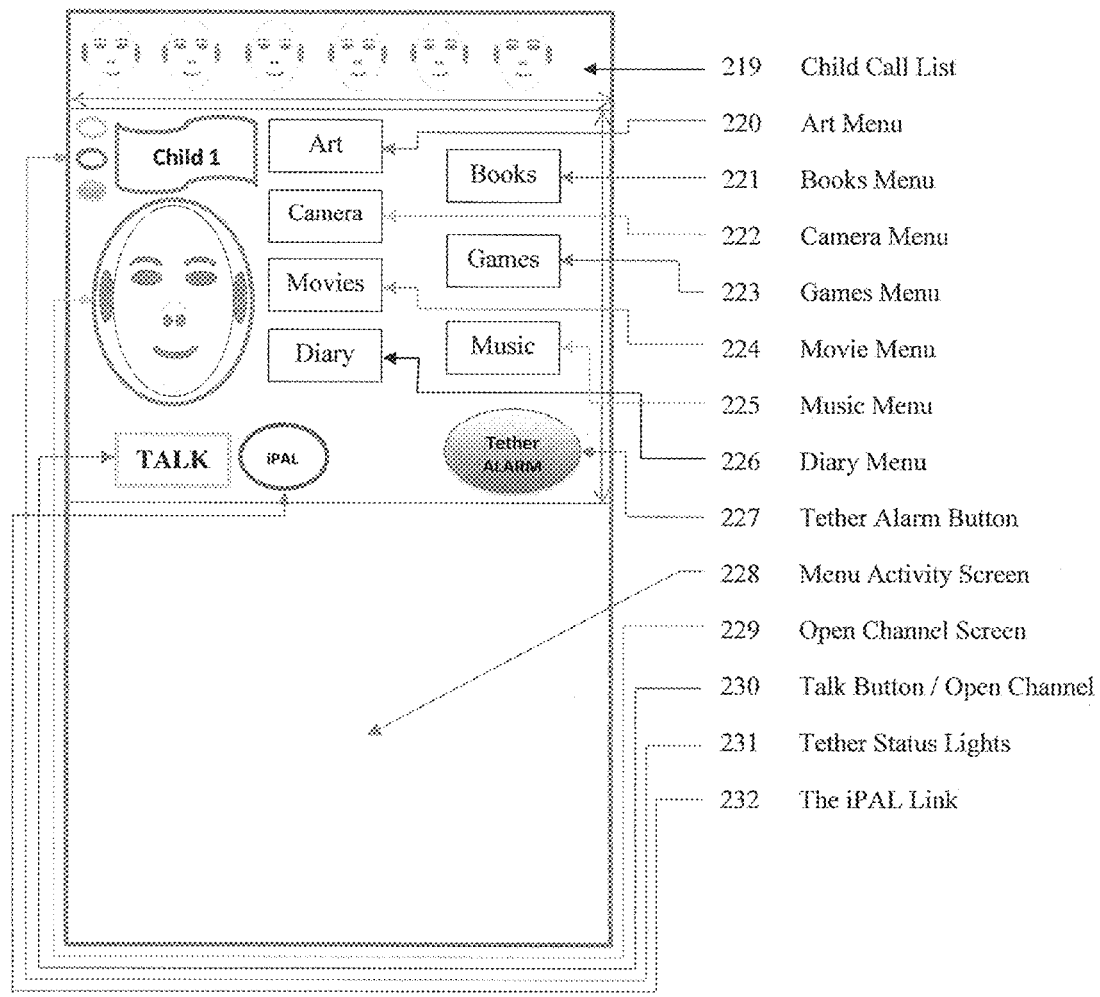
FIG. 25 is a schematic front view illustrating a first example main menu of the child interface in accordance with various embodiments.
Figure 26:
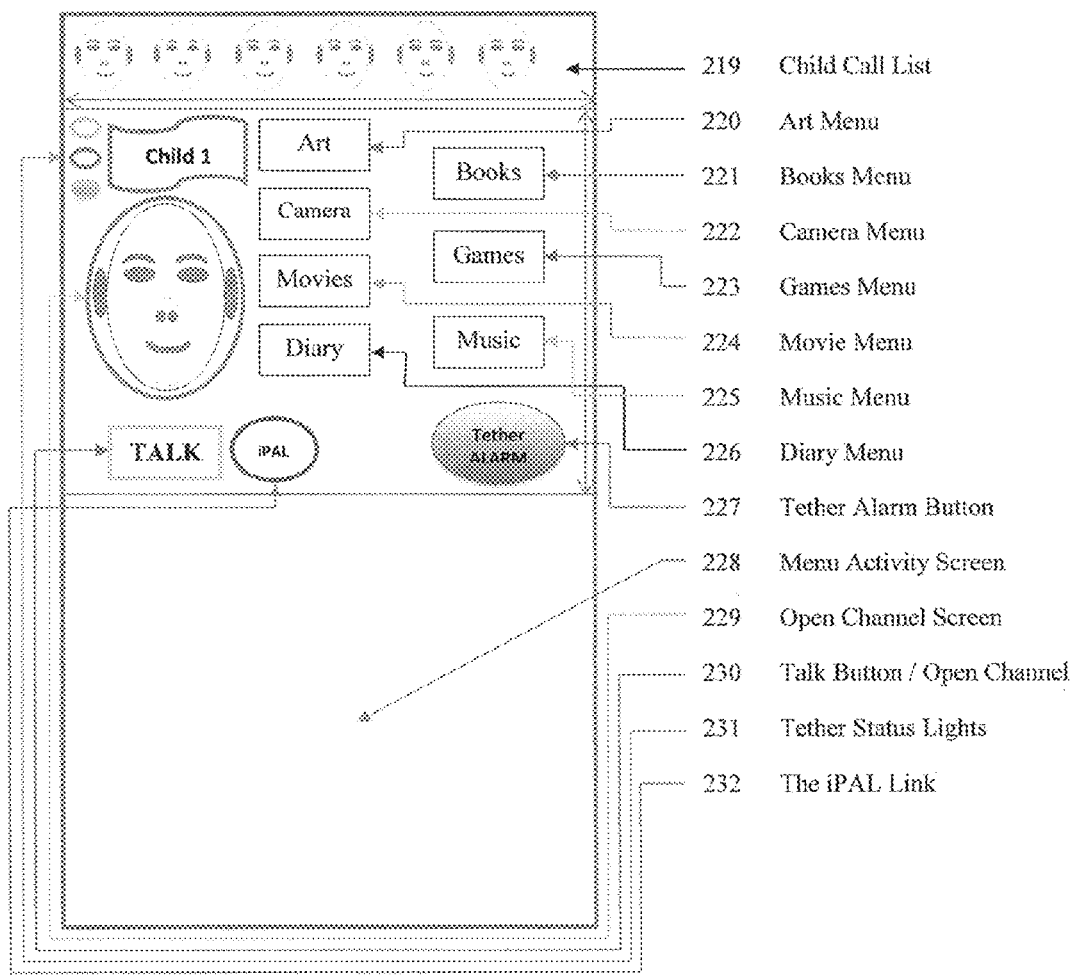
FIG. 26 is a schematic front view illustrating another example main menu of the child interface in accordance with various embodiments.
Figure 27:
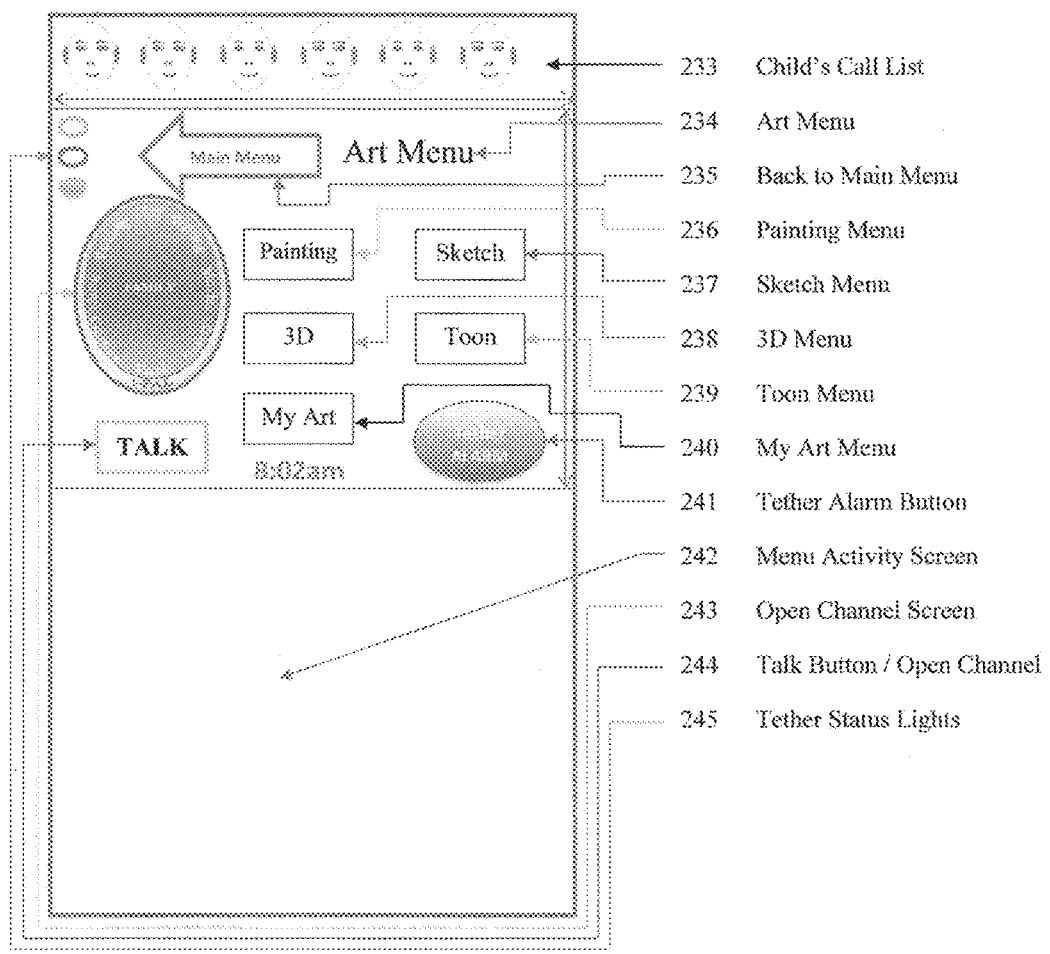
FIG. 27 is a schematic front view illustrating an example art menu of the child interface in accordance with various embodiments.
Figure 28:
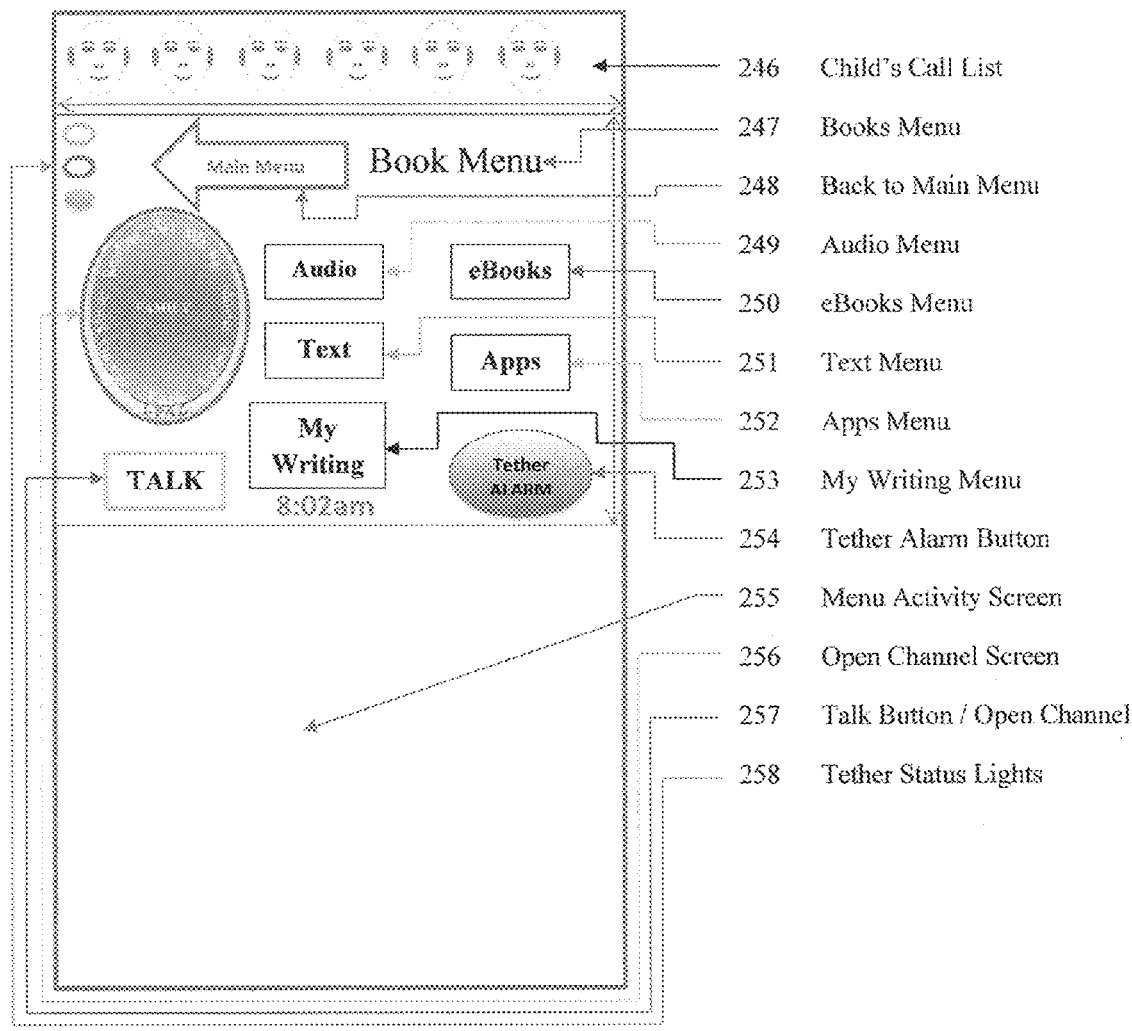
FIG. 28 is a schematic front view illustrating an example books menu of the child interface in accordance with various embodiments.
Figure 29:
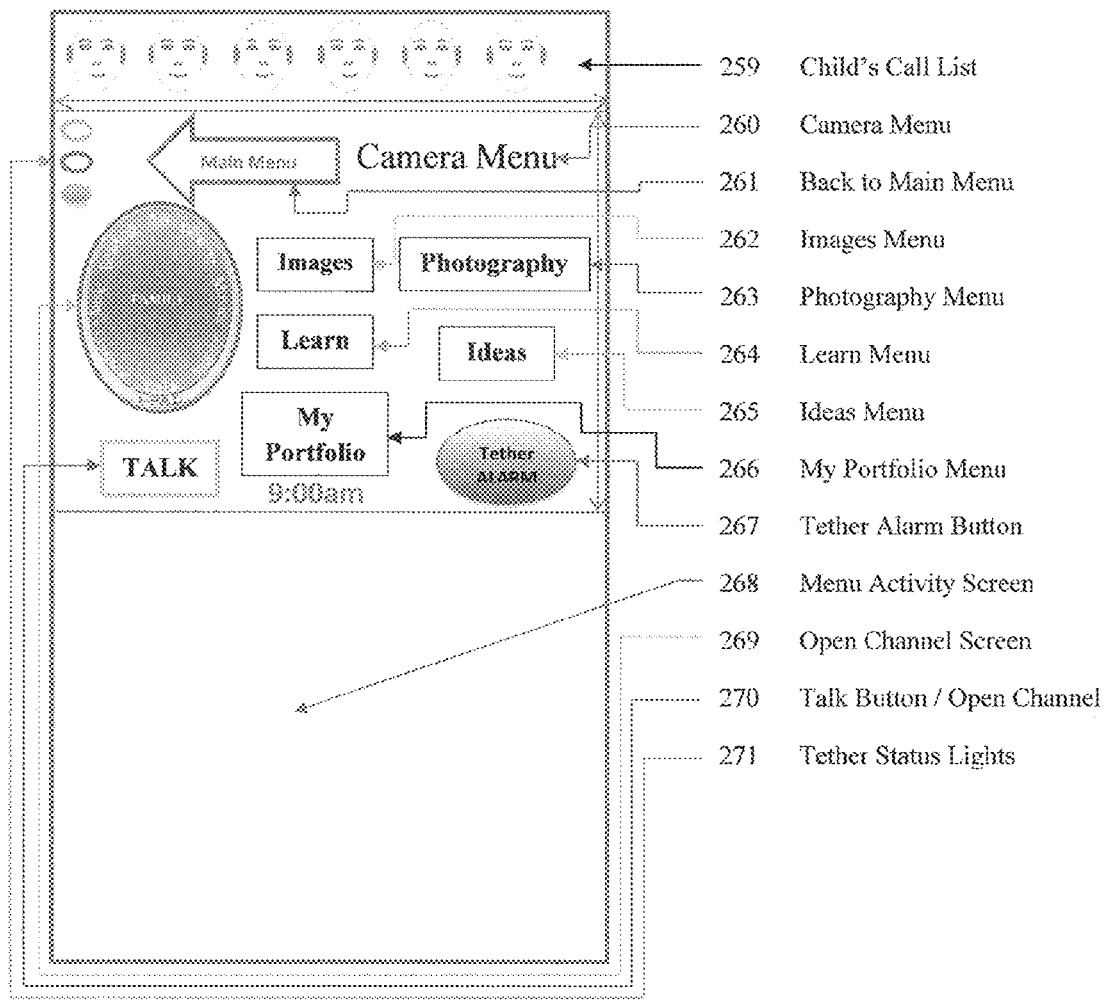
FIG. 29 is a schematic front view illustrating an example camera menu of the child interface in accordance with various embodiments.
Figure 30:
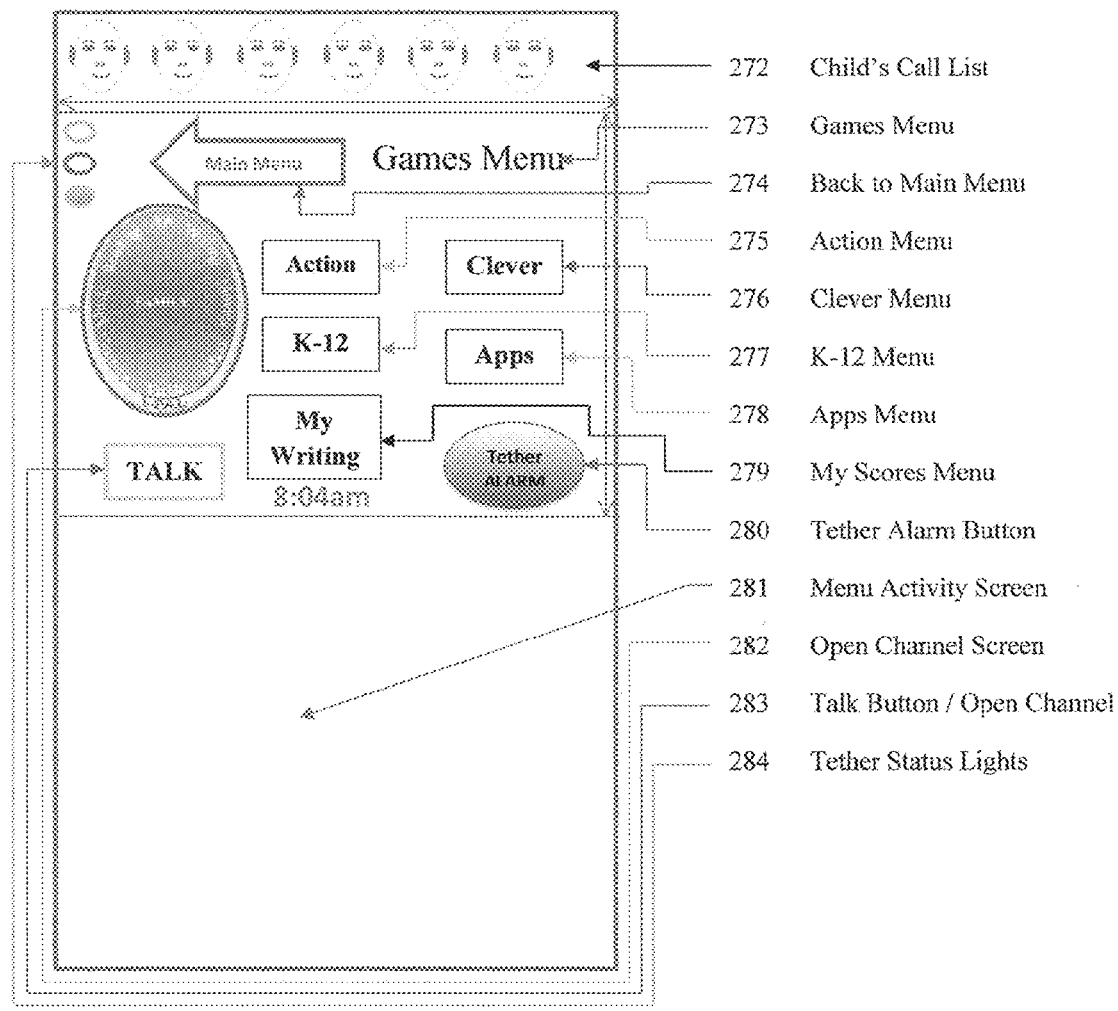
FIG. 30 is a schematic front view illustrating an example games menu of the child interface in accordance with various embodiments.
Figure 31:
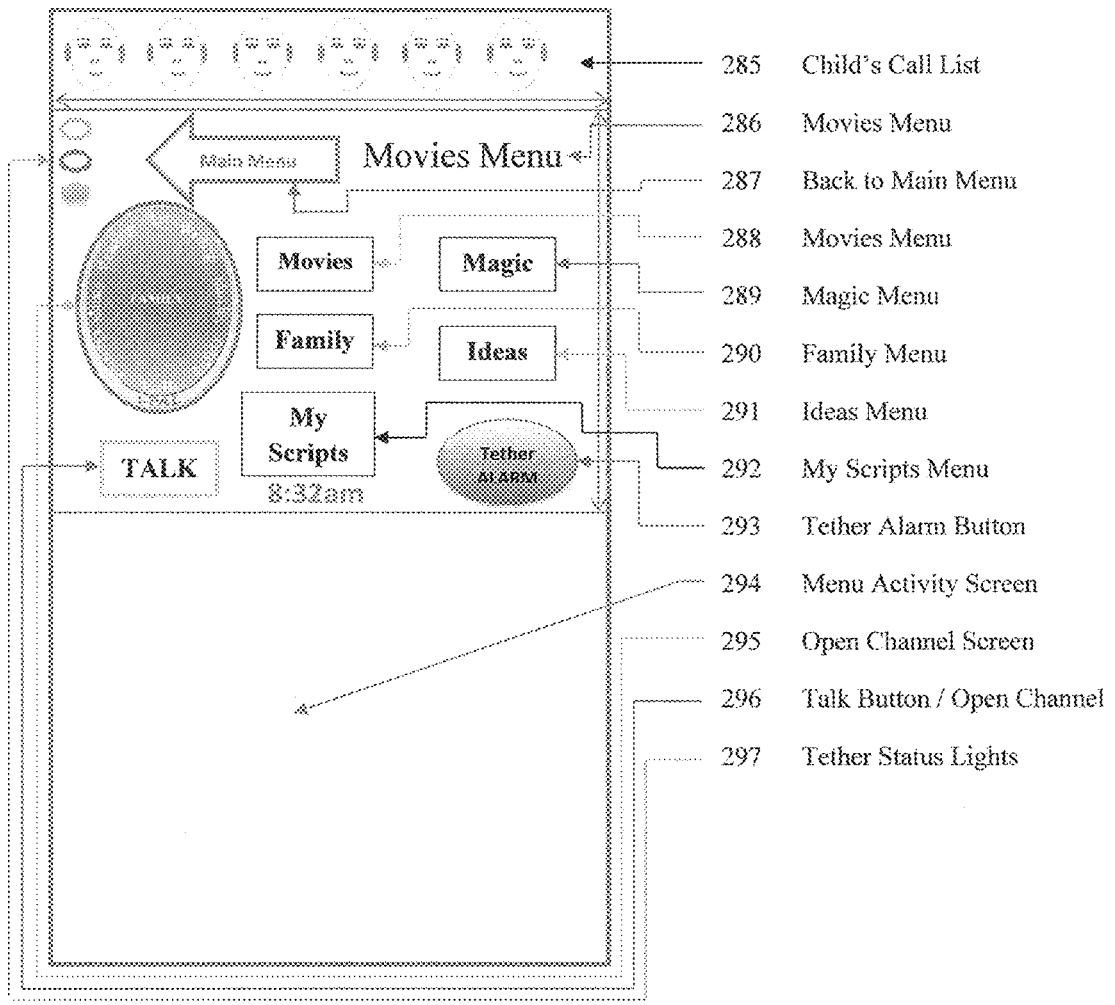
FIG. 31 is a schematic front view illustrating an example movies menu of the second user, or child's interface, in accordance with various embodiments.
Figure 32:
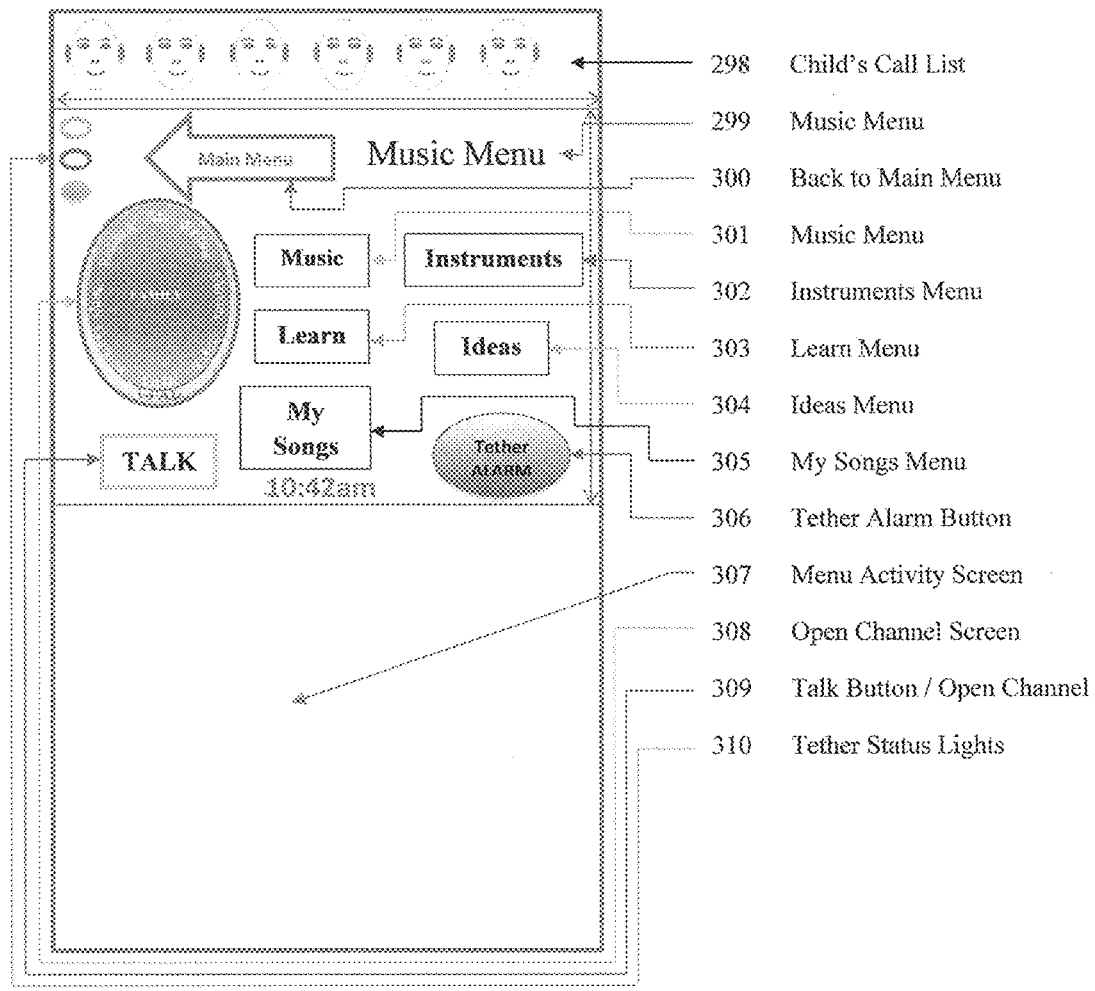
FIG. 32 is a schematic front view illustrating an example music menu of the child interface in accordance with various embodiments.
Figure 33:
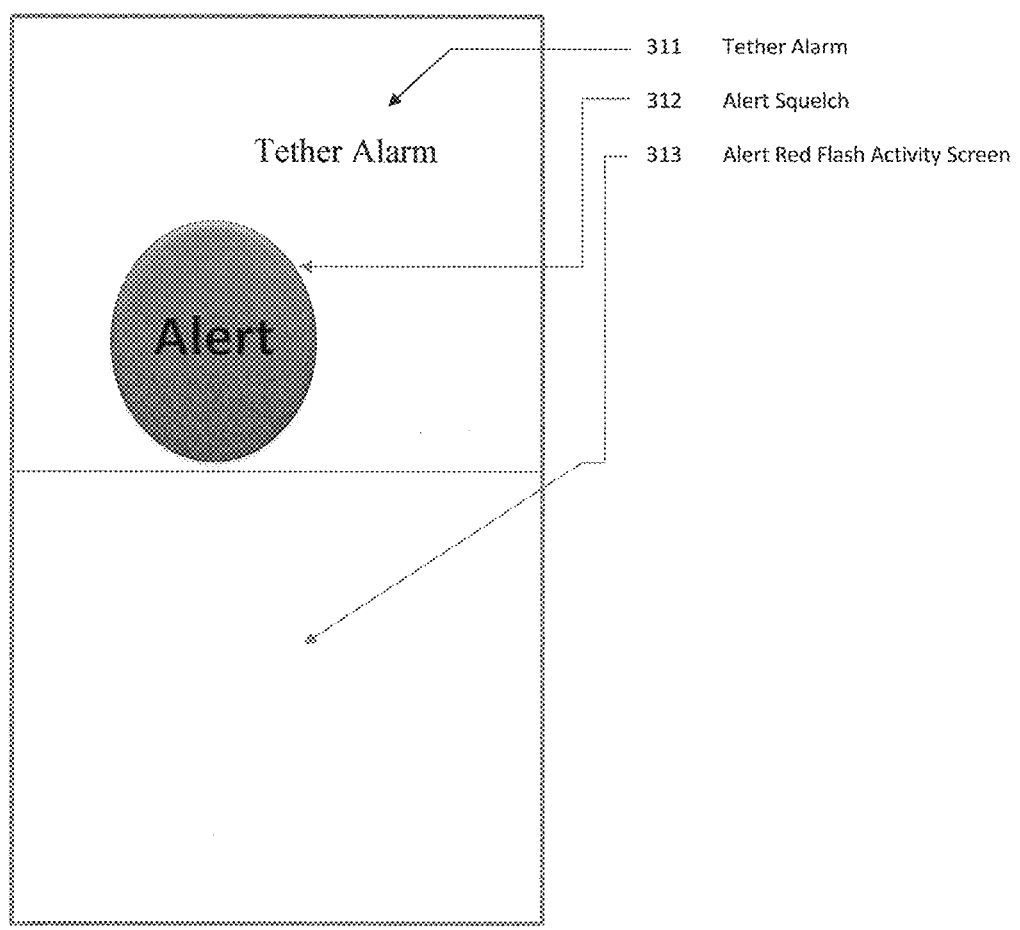
FIG. 33 is a schematic front view illustrating an example tether alarm of the child's interface in accordance with various embodiments.
Figure 34:
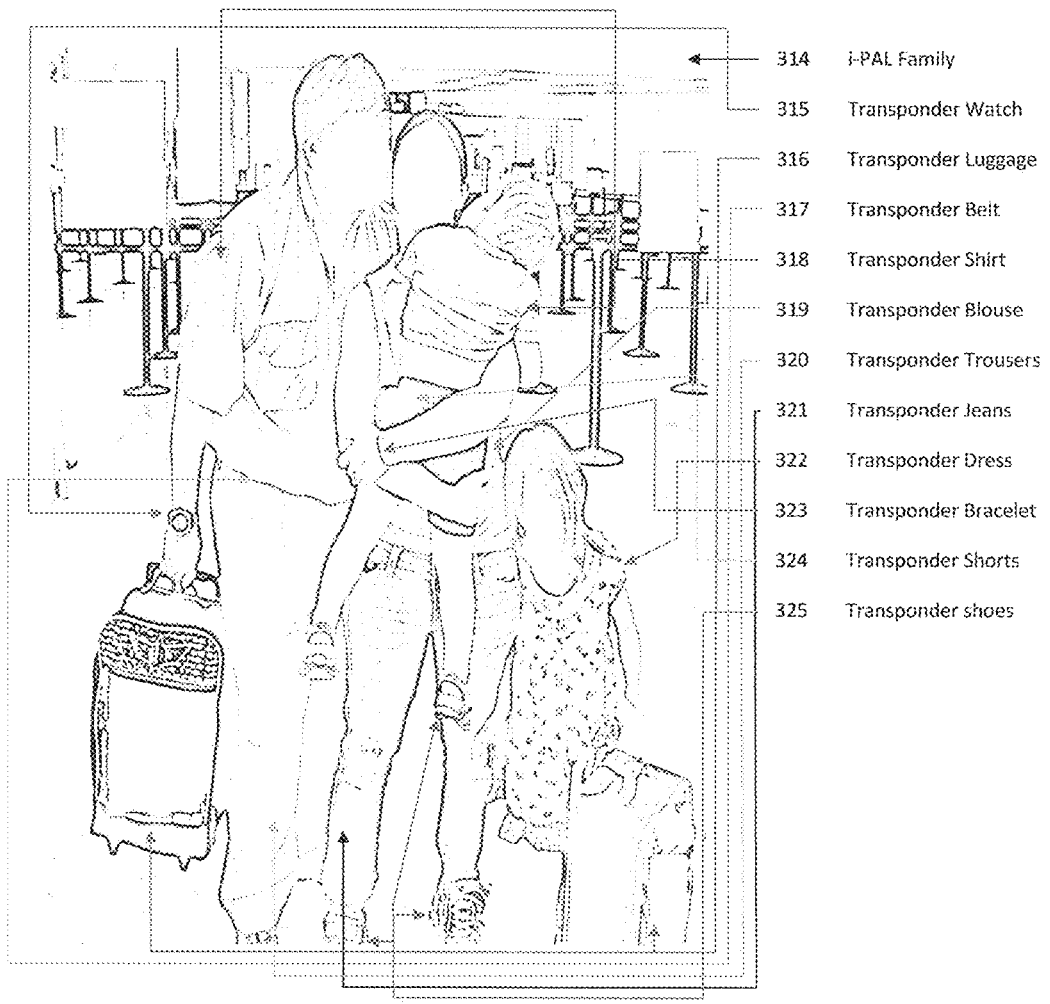
FIG. 34 is a perspective view illustrating an number of example locations where transponders may be placed in accordance with various embodiments.

Referring now to FIG. 1, wherein an example system 500 is schematically illustrated. The system 500 may be at least partially enabled by one or more processors 505. The system 500 may include a first device 510 that may include a display 515 for displaying a selected content item 520 which may be made accessible to the first device 510 via download and/or streaming from a network 525. The first device 510 may have a first device input 527 to interact with the content item 520. A second device 530 may be coupled to the network 525 and may be configured to control access to and/or to monitor the use of the content item 520 by the first device 510 as illustrated at 535.

A heuristics module 540 may be included for determining whether the first device 510 has utilized the content item 520 to a level of utilization greater than a predetermined value and to form a suggestion 545 based on the determination made by the heuristics module 540. A communication module 550 may be included to send the suggestion 545 to the second device 530 to provide the first device 510 with an updated and/or a second content item 555.

The updated and/or a second content item 555 may be stored in a database and/or memory 565. The database and/or memory 565 may be included in the network 525 and/or resident in other appropriate forms, or locales including, but not limited to other computing devices, and/or the first and second devices 510/530.

The system 500 may also include a second device input 570 to approve the suggestion, and to cause the updated and/or a second content item to be made accessible to the first device 510. With some examples the level of utilization may be determined by the one or more processors 505 based on education criteria. In some cases the level of utilization may be determined by the one or more processors 505 based on a use rate indicative of an interest level. In still other cases the level of utilization is determined by an input made with the first device input 510. With some example cases, the suggestion 545 may be made at least partially based on a previously completed set of substantially subjective questions.

In some examples, the first device 510 and the second device 530 may respectively be a first and a second smart phone. Other devices may be used, and'or may be utilized as the first and second devices.

In some examples, the display 515 of the first device 510 may be configured to receive a touch input. The first device 510 may also be configured to display a respective visual response upon receiving the touch input that may resembles a surface of water being touched at a location of the touch input. Some examples, may include a second display 575 on the second device 530. The second device 530 may be configured to receive a touch input, and to display a respective visual response upon receiving the touch input that may resembles a surface of water being touched at a location of the touch input.

In some cases, upon receiving touch input, the first display 515, and/or the second display 575 may provide visual feedback around a location on the respective display that receives the touch input in the form of expanding concentric rings of distortion of a current image shown on the display 515/575. The concentric rings of distortion may be determined from empirical data regarding how light may transmit and/or refract when passing through a liquid and or a liquid/air interface.

With some examples, the first device 510 may include a locator element 580 to identify a physical location of the first device 510. The second device 530 may include a tracking module 585 to track the physical location of the first device 510.

With some examples one or both of the first device 510 and the second device 530 may be configured to issue an alert to at least the second device 530 when a distance between the first device 510 and the second device 530 exceeds a predetermined maximum. The alert may be issued by the first device 510 and the second device 530.

With some examples first device 510 may include a camera 595 and the second device 530 may be able to display on the second device display images and/or video captured by the first device camera 595. In some cases, the second device 530 may have a second device display 575 and the first device and the second device may each include a camera 595. The second device may be able to display on the second device display 575 images and/or video captured by the first device camera 595, and the first device 510 is able to display on the display 515 of the first device 510 images and/or video captured by the second device camera 595.

With some examples, changes made by the first device 510 to the content item(s) 520, 555 may be saved at least temporarily to a memory 605 resident on the first device 510. The changes may be saved as one or more revisions of the content item 520, 555 by one or more additional memories 605, 565 resident in the network 525 and/or resident on the second device 530.

Example embodiments may provide a system 500 that may include a first processor enabled device 510 having a display 515 for displaying a selected content item 520 made accessible to the first processor enabled device 510 via download and/or streaming from a network 525. The first processor enabled device 510 may have a first device input 527 to interact with the content item 520. A second processor enabled device 530 may be coupled to the network 525 and may be configured to control access to and/or to monitor the use of the content item 520 by the first processor enabled device 510.

The system 500 may also include a heuristics module 540 for determining whether the first processor enabled device 510 has utilized the content item to a level of utilization greater than a predetermined value and to form a suggestion based on the determination made by the heuristics module 540. A communication module 550 may be configured to send the suggestion to the second processor enabled device 530 to provide the first processor enabled device 510 with an updated and/or a second content item 555. A second device input 570 may be used to approve the suggestion, and/or to cause the updated and/or a second content item 555 to be made accessible to the first processor enabled device 510. With some examples the level of utilization may be determined by the one or more of education criteria, an interest level of a user of the first processor enabled device 510, an input made by the user into the first device input 527, and responses to a previously completed set of substantially subjective questions.

Referring now to FIGS. 2-34, wherein various example embodiments and portions of embodiments including display and/or interface images in accordance with one or more embodiments of the current application are described. Reference numbers may appear prior to corresponding descriptions thereof. The reference numbers may in turn identify corresponding elements in respective figures included in FIGS. 2-34. Systems 500 in accordance with the present disclosure may be referred to as the i-PAL Network, and/or the i-PAL.

001 The Admin Login Screen is required in the mornings to prepare the family for the day and make sure that the i-PAL handhelds are synced and schedules are updated. This is an excellent time to update scrolling marque schedules for the day. The i-PAL Network is always on in the background allowing the parent to work on other files and programs during the day. The login times can be adjusted in the Settings menu. The Admin account is required to login after three minutes of inactivity, when rebooting the network, when powering up the handheld after charging a dead battery and so on. This login screen is to secure the Parent i-PAL from strangers or children that want to play. The Admin i-PAL interface is the core of the i-PAL network file structure and security and should always be safe from intrusion. Login is also required when the parent is working from the Desktop and wants to re-enter the i-PAL Main Menu by tapping the iPAL link on the Desktop. This is a mandatory login. When the child reaches an age where he or she can understand the username and password concept, this feature can be added to the Child's i-PAL. This will be a nice feature to keep brothers and sisters from invading their sibling's privacy. This is also a good way for the child to secure the i-PAL from children at the Dojo, in the neighborhood, in the park, or at school.

002 This is the handheld status section containing wireless vendor logo, 3G connectivity, connectivity strength, and Internet time. On the PC, Internet time will be shown.

003 This is the i-PAL Admin Welcome Window. This is a good indicator that one needs an administrative account in this i-PAL Network to continue logging in.

004 The i-PAL Logo Watermark covers the Portrait Communicator while offline.

005 This is the i-PAL Portrait Communicator that is currently offline.

006 This is the Administrative Login Section.

007 The Administrator login ID screen uses a floating menu that mimics water being touched. The user taps the screen and a touchpad appears below, on a handheld, to enter the appropriate user ID with administrator credentials. The user must have been added to the i-PAL Network as an administrator prior to using this screen. Parents are authorized access to the Admin interface when their user profile has been given admin privileges to assist in managing the network. There should always be at least two users with this privilege in the family. There is no difference in procedure between the handheld and the PC or tablet. When a new user is added to this privilege, the administrator taps the Sync button and all devices in the i-PAL Network are updated with this new credential. An updated feature is the web platform that allows the parent to setup login so that both handheld unit and web profile are logged in awarding the child, adolescent, and teenager access to the their profile containing personal files, personal settings, and parent issued software on devices external to the child's i-PAL. These devices are part of i-PAL Networks at Public Libraries, K-12 Schools and University campuses. This allows the child to show work in a familiar setting shared with family and with teachers.

008 The Password screen taps like water, and drops a floating touchpad, on handhelds, to type in an alpha numeric that cannot resemble the user's name nor have similar characters.

009 The i-PAL Family Member Name banner displays the appropriate name attributed to the Admin user credentials entered on the Login screen. When the user logged in successfully, the screen came online and more options became available.

010 The i-PAL Network Status section is only accessible to administrators. This is where the i-PAL Network informs the parent of all that is i-PAL.

011 The Devices Connected screen shows all devices within the i-PAL Network that are connecting properly and those that are supposed to be, but not. By tapping this screen that simulates the touch of water, The parent can scroll up and down the list by tapping the left or right ends of the elliptical screen and tapping the Index Taps on the left of the elliptical to advance in either direction. When a device is not working, the parent can tap the device and a floating menu will provide diagnostic tools to reconnect the device or remove it entirely if this is a recurring event and the device is no longer a desired component of the i-PAL Network.

012 The Security Status Alerts screen allows the parent to similarly access the alerts and when found use the floating menu to address the alerts. Some alerts are as common as update alerts and some as important as child tether alerts.

013 The i-PAL Family Members Monitored screen allows the parent to go through the list and ensure that members removed from the network are still removed and that new members are added successfully. If there is an issue the parent can use the floating menu from this screen to resolve issues and administer a global sync for resolution.

014 The Library screen holds all purchased files and software including the profile assignments to this material. If a quick change needs to be done before the kids and other members are off for the day, the parent can pull up the screen's floating menu and add, configure, and delete as needed before school starts. The Web Platform shows up here and allows the parent to see the family member's profile to ensure all is where it should be and connecting successfully.

015 The Tether Add/Sync section allows the parent to connect her or his tethers for the day. The parent is offered the same protection as the child and also uses tether devices to protect the family member from assault, car jackers, pickpockets, and those that have been let out of prison and want to commit violence towards another person.

016 The Index Taps are a very useful tool to help the parent navigate the huge database in the i-PAL Network Status section. Taps forward the parent in either direction as the parent taps the end of the elliptical to go down or up the list. Each item has its own associated floating menu to manage that item successfully without having to navigate all over the i-PAL Network to try to set configurations or personally turn something off and on to reconnect. The Taps make this easily accessible in this simple interface.

017 The Tether Status Lights show that the Tether Add/Sync section was successful. Green is GO! Green/Yellow means one tether is acting goofy. Yellow/Red means tethers are damaged and need to be checked. Red means the tethers added to the parent's i-PAL are 018 The Administrative Main Menu of the i-PAL interface contains all of the menus needed to manage the family's creativity, educational progress, and entertainment needs. Since each family member has different developmental needs, each profile has individual settings for educational development, interests and personal management.

019 The Menu Bar displays the five core menus of the i-PAL Network.

020 The Scroll Bar will be required on devices not using touch screen technology.

021 The Family Member menu section displays the member's profile with individualized menu sections; in this case the child profile is being viewed.

022 The Portrait and Banner provides a visual ownership to the profile and a happy smile for the parent. The portrait can display video files in loop. The Banner with the child's name can be tapped to display only that child's profile. The Portrait screen is the primary communications open channel utility for talking to the i-PAL family and friends.

023 The Art menu stores programs and creative files used and inspired by the child.

024 The Books menu stores audio books, electronic books, and programs. This menu also stores creative stories written by the child using programs added by the parent.

025 The Camera menu stores photography programs, pictures and projects. This virtual photography studio allows the child to take pictures and re-invent them with imagination.

026 The Games menu stores creative, educational, and entertaining games for the child.

027 The Movie menu stores programs allowing the child to create short movies with the camera. Purchased movies from the Library are made available for the child to watch.

028 The Music menu stores programs that teach the child musical concepts and how to play musical instruments. Purchased music from the Library are here for the child to enjoy.

029 The Talk menu allows the parent to assign ringtones, reminders, and alarms for the child. The parent can also talk to the child from this menu creating an open channel to the child.

030 The Tether menu allows the parent to ensure active GPS lock on the child, set the radius levels for a shopping mall visit, test and change the squelch levels and test Wi-Fi connectivity of the child's i-PAL and alarm settings. The tethers between the child and i-PAL are tested to ensure the tether technology in the child's wardrobe is working.

031 The i-PAL Network Status screen is only a click away by tapping the iPAL link.

032 The Record button allows the parent to record activity during open channel sessions.

033 The Desktop button allows the parent to take care of other business outside of i-PAL and come back in when needed. The iPAL link opens the login to return to the Main Menu.

034 The Sync button allows the parent to connect his or her Tethers to the i-PAL handheld.

035 The GO Lights/Tether Status Lights let the parent know the family tethers are working.

036 The Main Menu Return section makes navigation back to the main menu as easy as a tap to the screen. Anywhere in this section will return the parent back to the Main Menu.

037 The Art menu allows the parent to add newly purchased art programs to the child's i-PAL and delete old programs from the child's i-PAL handheld to send back to the Library.

038 The Add menu allows the parent to add new art programs and art files for the child.

039 The Delete menu allows the parent to remove old programs and art files no longer used.

040 The Sleep menu allows the parent to set sleep states on the programs to give the child opportunities to experience other daily activities. Sleep states can be scheduled for timed intervals for all i-PAL compatible programs.

041 The Time menu allows the parent to view time spent on programs. This provides a good measure of what programs to schedule removal and what programs may require future updates to enhance the creative experience for the child's favorite program.

042 The Note menu allows the parent to leave audible notes for the child commenting on the art he or she has saved or currently working on. This allows the parent access to the child through inspiration and motivation. The child will appreciate feedback from the parents.

043 The My Art menu stores all of the child's artistic work from the many art programs added to the child's i-PAL handheld. All i-PAL compatible programs allow the child to save artistic masterpieces in the My Art menu. If the child wants to open a creation, i-PAL will always save the original for synchronization to the Library and will allow the child to create a new original from the copy opened. This allows the parent to see progress in work and creativity from each rendering to the newest rendition. This system protects treasured memories and will be treasured by the child in later years.

044 The Menu Activity Screen makes it easy for the parent to preview settings, program lists, and files without straying from the Art Menu. This simple interface allows the parent to adjust all elements in the menu clearly and quickly. A single tap of the screen allows the full page option so that more can be viewed. Another tap sends it back to normal.

045 The Child's Portrait allows the parent to see the child that the menu belongs to. This portrait can be set to short video files or single picture files. It also serves as the open channel communication screen for speaking with the child directly. The parent will see the video as seen from either tether cameras or the i-PAL handheld. This is also a good way to sneak-a-peak at what the child is up to.

046 The Talk button can be set for visual mode or open channel mode. The visual mode allows the parent to see what the child is doing and the open channel mode allows the parent to converse with the child. This is a good option in the child's menu area as the parent can ask about programs not being used anymore or just as a question or two. It is also a great opportunity to remind the child that homework starts very shortly. A single tap opens a floating menu with other options for communication such as texting.

047 The Tether Status Lights indicate to the parent that the tether technology is working.

048 The Main Menu Return section is a single tap away from the Books menu.

049 The Books menu allows the parent to manage the child's audio, electronic book, creativity, reading and writing programs. The Child can learn to write in French.

050 The Add menu allows the parent to add new listening, reading and writing programs and files for the child to experience the full breadth of whatever language they are learning. These programs and files are added from the i-PAL Network Library and made available to the child for his or her i-PAL handheld, web platform profile, and tablet.

051 The Delete menu allows the parent to remove old programs and files no longer used. The parent can place a delete flag next to the item and the child can keep the item if the flag is removed, which can be done by the child or parent. In this manner, favorite stories can be available when missed. All books and files are always stored in original form in the i-PAL Library including new masterpieces created by the child that change ideas daily.

052 The Sleep menu allows the parent to schedule sleep intervals and schedule timers to close audio books, electronic books, and programs safely. The child hears the program or book saying that it is tired and to try again tomorrow. This gives the parent an advantage to plan the child's day without too much stress.

053 The Time menu allows the parent to audit the time spent on audio books, electronic books, and programs. For those programs and books no longer accessed, the parent can schedule deletion from the child's i-PAL. Immediate deletion can occur in the Delete menu. A program or book being accessed by the child can only be scheduled for deletion. For those programs and books, that the child has been pouring time into, the sleep state can be applied to give the child rest from reading and protect the child from eyestrain. This is a wonderful tool to discover the child's likes and dislikes.

054 The Note menu allows the parent to leave notes for the child commenting on poetry or writings the child has saved or is currently working on. This allows the parent access to the child through inspiration and motivation. The child will appreciate this feedback.

055 The Imagination menu stores all of the child's literary work from the creativity programs added to the child's i-PAL handheld. All i-PAL compatible programs allow the child to save creative literary masterpieces to the Imagination menu. If the child wants to open a creation, i-PAL will always save the original for synchronization to the Library and will allow the child to create a new original from the copy opened.

056 The Menu Activity Screen makes it easy for the parent to preview settings, program lists, and files without straying from the Books Menu. This simple interface allows the parent to adjust all elements in the menu clearly and quickly. A single tap of the screen allows the full page option so that more can be viewed. Another tap sends it back to normal.

057 The Child's Portrait allows the parent to see the profile owner and access open channel.

058 The Talk button contacts the child for open channel communication anywhere/anytime.

059 The Tether Lights are green indicating that the transponders are working on the child.

060 The Main Menu Return section allows the parent to leave the Camera menu and work in the Main Menu or click the Desktop to catch-up on other things.

061 The Camera menu allows the parent to manage creative, educational, and entertaining photographic programs used by the child on the Child's i-PAL.

062 The Add menu allows the parent to add new creative, educational, and entertaining photography-related programs to the Child's i-PAL. Programs added in this menu include blue screen, effects, retouching, and digital darkroom genres. The child will learn that photography can be creative and fun.

063 The Delete menu allows the parent to remove programs no longer accessed by the child. The deletion does not delete the program, but returns the program to the i-PAL Library.

064 The Sleep menu allows the parent to configure sleep states for i-PAL compatible programs in order to keep the child motivated and engaged in new activities. For programs in this menu, the programs can tell the child that they are tired and to come back tomorrow. As video editing can be time consuming, this will keep the child constantly moving forward into new projects and more creative fun.

065 The Time menu shows the parent the time spent on programs. This is a wonderful opportunity to understand what photographic aspects the child enjoys and what programs serve no interest to the child. This can help with future program purchases for the child.

066 The Note menu allows the parent to leave audible notes for the child commenting on photographs taken by the child or funny airbrush projects that will be shared by the whole family. The parent might discover unexpected imaginative ideas created by the child saved in this menu. This allows the parent access to the child's creative side and to give encouragement through inspiration and motivation that the child will appreciate.

067 The My Pictures menu is where the programs in this menu store creative work and projects from the child. All originals are saved in the i-PAL Library during the daily sync and no original will be accidentally overwritten by the child. The parent can preview all work from here and send all work to personal folders or Library for safe keeping if the folder has not been synchronized enough during the day. Backups are always done through sync, but children like to use the camera to take pictures and movies so much that they may fill their handheld storage constantly prior to their next sync cycle.

068 The Menu Activity Screen provides a wonderful resource for previewing all of the pictures taken by the child and edited to the point of incomprehension. Remember, a single tap gives a full screen for previewing and another brings the screen back to normal.

069 The Child's Portrait allows the parent to see the profile owner and access open channel.

070 The Talk button contacts the child for open channel communication anywhere/anytime.

071 The Tether Status Lights are always live and active. Tethers drops out=RED Light.
Just one drops out will indicate a yellow light. Tether devices are easily replaceable.

072 The Main Menu Return is a fast way to get back to business for the parent.

073 The Games menu allows the parent to manage creative, educational, and entertaining games for the child in a simple and logical interface.

074 The Add menu allows the parent to add new creative, educational, and entertaining games to the Child's i-PAL. Games added in this menu include educational games that allow scores and grading levels to be saved in the child's Scores menu for parental review. Purchased games are added from the i-PAL Library.

075 The Delete menu allows the parent to remove games no longer accessed by the child. The deletion does not delete the program, but returns the program to the Library.

076 The Sleep menu allows the parent to configure sleep states for games in order to keep the child motivated and doing different daily activities.

077 The Time menu shows the parent the time spent on games. This tool allows the parent to judge the pros and cons of what the child is accessing and what the child could be doing. All i-PAL compatible games can be scheduled for sleep states. This manages the time spent on frivolity. This also allows the child more time to experience the educational games that have open sleep states allowing the child to access them frequently.

078 The Note menu allows the parent to leave notes for the child commenting on high scores and academic level achievements determined by heuristics in the gaming programs. This lets the child know that they are doing well educationally and making her or his parents proud of well-deserved accomplishments. This allows the parent access to the child through inspiration and motivation. The child will appreciate this feedback.

079 The Scores menu shows performance reports and awards that the child has earned through the educational software on the Child's i-PAL. This menu shows the level of academic progress the child is making and the scores awarded. This data is also shared with the web platform so that software partners can select appropriate software for the parent to purchase for the child's continued progress.

080 The Games Menu Activity Screen is a very handy viewing area for managing this menu with ease without leaving the Games menu screen.

081 The Child's Portrait allows the parent to see the profile owner and access open channel. If the parent is working in this or any other menu while open channel with the child and notices that the child has been approached or has a vehicle pull alongside the child, the parent can tap the communications screen and select Record from the floating menu. This feature allows the parent to record the incident from the i-PAL handheld or a tether camera and gather audio, Data Logger data, and video that can be used in case of emergency. The parent can also speak for the child and request that the child be left alone or authorities will be notified. This connection to the child can save lives.

082 The Talk button contacts the child for open channel communication anywhere/anytime.

083 If the Tether Status Light is Green the child and the i-PAL are connecting successfully.

084 The Main Menu Return section makes navigation seamless and logical.

085 The Movies menu allows the parent to manage creative, educational, and entertaining movie-making programs and movie files used by the child on the Child's i-PAL device.

086 The Add menu allows the parent to add new creative, educational, and entertaining movie-related programs to the Child's i-PAL. The parent can choose from a huge selection of creativity programs including blue screen movie making, visual effects, story boarding, script writing, and movie making genres. This is a wonderful menu for future actors, directors, and scriptwriters. Purchased movies are added from the Parent i-PAL Library to give the child enjoyable films to watch and develop curiosity in many genres.

087 The Delete menu allows the parent to remove programs and movies no longer accessed by the child. The deletion does not delete the program, but returns the program or movie to the i-PAL Network Library.

088 The Sleep menu allows the parent to configure sleep states for i-PAL compatible programs and movies in order to keep the child motivated and engaged in new activities. This is a very handy tool when a child restarts a movie continuously when the end credits starts just to watch the movie over, and over again. With this option, the movie tells the child that it is tired and to try again tomorrow. The child goes to something else and does not beg the parent to allow further watching of the movie. Stress is now resolved.

089 The Time menu shows the parent the time spent on programs and movies. This tool allows the parent to weed out programs and movies that are either too complex for the child or not interesting the child and schedule the movie or program for deletion. If the child tells the parent that their program or movie is gone and they would like to use or watch it, the parent can add the movie or program back. Stress is no longer a factor.

090 The Note menu allows the parent to leave notes for the child commenting on projects viewed in the Scripts menu. The parent might discover unexpected imaginative ideas created by the child and saved in this menu. This allows the parent access to the child's creative side and encourages continued passion through inspiration and motivation. The child will appreciate this feedback and make better and bigger creative projects.

091 The Scripts menu is where the programs in this menu store creative work and projects from the child. All originals are saved in the i-PAL Library during synchronization and no original will be accidentally overwritten by the child after a day of creating wonders.

092 The Movies Menu Activity Screen is a great place to view the child's work and projects as well as configure setting for this menu. As always, a simple tap on the screen brings full screen mode and another tap returns to normal mode.

093 The Child's Portrait allows the parent to see the profile owner and access open channel.

094 The Talk button contacts the child for open channel communication anywhere/anytime and answers calls from the child, family and friends.

095 The Tether Status Lights are a good indicator of the actual state of the child's tethers.

096 The Main Menu Return section lets the parent tap back to the Main Menu.

097 The Music menu allows the parent to manage creative, educational, and entertaining music-related programs and music files used by the child on the Child's i-PAL.

098 The Add menu allows the parent to add new creative, educational, and entertaining music-related programs to the Child's i-PAL. Programs added in this menu include song writing, symbols, sounds, instruments, and melody. Purchased programs and songs are selected from the i-PAL Library and added to the child's Music menu.

099 The Delete menu allows the parent to remove programs and music no longer accessed by the child. The deletion reallocates the use to the i-PAL Library to be shared later.

100 The Sleep menu allows the parent to configure sleep states for i-PAL compatible programs and music in order to keep the child motivated and engaged in new activities. For programs in this menu, the programs can tell the child that they are tired and to come back tomorrow. This message can be changed to include purchased download messages made available for i-PAL or customized by the parent. For the music that is being listened to by the child, the volume will diminish gradually and the message alerts the child that the song can be played later. This is a gentle nudge for the child to do something more engaging.

101 The Time menu shows the parent the time spent on music and programs. This is a wonderful opportunity to understand what music the child enjoys and what music programs are of no interest to the child. This can help with future music and program purchases for the child. Music and Programs not accessed for a period can be scheduled for deletion. This saves space on the Child's i-PAL and provides new and refreshing educational and entertaining content for the child to enjoy.

102 The Note menu allows the parent to leave notes for the child commenting on music and song writing projects viewed in the My Songs menu. The parent might discover unexpected imaginative ideas created by the child saved in this menu. This allows the parent access to the child's creative side and to give encouragement through inspiration and motivation. The child will appreciate this feedback.

103 The My Songs menu is where the programs in this menu store creative work and projects from the child. All originals are saved in the i-PAL Library during synchronization and no original will be accidentally overwritten by the child. The child will learn to understand musical instruments and the sounds that they play and use this menu to design and compose music that can be shared with family and friends and enjoyed by all.

104 The Music Menu Activity Screen provides a clear area to view the menu screens without leaving the menu. This is a wonderful place to listen to new music from the child.

105 The Child's Portrait allows texting when the child in class or while attending outings.

106 The Talk button contacts the child for open channel communication anywhere/anytime.

107 A green and yellow light means the tethers are working, but one device has failed.

108 The Main Menu Return section makes navigation back to the main menu as easy as a tap to the screen. Anywhere in this section will return the parent back to the Main Menu.

109 The Talk menu allows the parent to configure communications accessed by the child.

110 The Add menu allows the parent to add communication programs, new family members and i-PAL Network friends of the child to the approved access list for the child's i-PAL handheld. These added people are accessible in the child's Call List bar and can always be called. New programs are i-PAL compatible and can be easily setup.

111 The Delete menu allows the parent to remove programs and call members from the list. Once removed, the picture of the person is no longer on the Call List bar.

112 The Sleep menu allows the parent to configure sleep states for communications programs except for Open Channel calls to the Call List. This feature controls times spent on video chat software and texting as both can consume many hours during the day.

113 The Time menu shows the parent the time spent in programs and on conversations with members of the call list.

114 The Video Chat menu allows the parent to secure the program so that the child can call his or her friends and not be called by others or be able to respond to unknown requests. This utility can be useful when friends are on vacation or have left the area and want to stay in touch. As long as the program can be securely locked now, the child can access it in the i-PAL Network to communicate with family and friends in the Call List.

115 The Texting menu allows the parent to set restraints on texting so that only those on the authorized list can communicate in this manner with the child. The utility can be completely locked down here or opened to i-PAL Network family and friends. Though texting appears to be a huge distraction, it is the staple of modern society and a necessity to teenagers. This menu provides the parent with tools to safeguard the child while using this utility. It is also a good way to communicate with the child when the child's handheld is on vibrate during class or at special functions and the parent needs to inform the child that he or she has a fresh shirt, homework, or lunchbox waiting or to remind of a scheduled appointment. This feature, though useful, should not be used while driving, skateboarding, bicycling, and skating or surfing as it detracts from concentration.

116 The Menu Activity Screen provides a wonderful screen space to preview all of the communications settings that are quite extensive in this menu.

117 The Child's Portrait allows the parent to see the profile owner and access open channel. It is also a great resource to check email, get alerts, and use the floating menu to call from the parent Call List while working in the child's settings. This way the parent stays in touch while engaged in family matters.

118 The Talk button contacts the child for open channel communication anywhere/anytime.

119 If the Tether Status Lights are yellow/red or just red, the tethers need replacing.

120 The Main Menu Return section makes navigation back to the main menu as easy as a tap to the screen. The Banner in the Main Menu opens the member menus on handhelds.

121 The Tether menu allows the parent to establish boundaries and alarms to keep the child safe. The tether is a virtual umbilical that alarms the child when he or she has traveled too far from the parent. This is a valuable tool for shopping with children, attending parties with children, and going on outings with children. Instead of the stress being solely on the parent, the child will comply with the established boundaries when the warning alarm alerts the child that he or she has gone too far away from the parent. This will also help the parent with missing handhelds as the child will not be able to put her or his i-PAL handheld down and walk away as it will set off the tether alarm and begin the lock down and transmit process, by this point the squelch will fill a thousand feet with high decibel noise ensuring the child never leaves her or his i-PAL unattended.

122 The Alarms menu is calibrated by the parent to provide varying levels of alarm warnings for straying out of bounds.

123 The GPS menu indicates that the GPS is working on the child's i-PAL handheld and that the web platform for the roaming profile has the same GPS location. If incorrect, the parent can tap the sync button within this menu to re-sync the web and local profiles.

124 The Levels menu allows the parent to set the levels of warnings and the sound used to inform the child that he or she has traveled out of bounds from the parent.

125 The Squelch menu tests the squelch alarm on the child's i-PAL. If the child is separated from her or his i-PAL for a specified length of time, the Squelch begins to sound off. If signal is not reestablished, the i-PAL locks the device and all security data is uploaded to the Parent i-PAL. The parent can call the child and warn her or him with a quick text or schedule for a time when not in a crowded environment.

126 The Radius menu allows the parent to set radius boundaries around the parent. This is an excellent tool when visiting a mall, store or shopping plaza. The child will be tethered by sound alerts. Instead of the child straying off to smell chocolate or look at toys, the child will have to stay close to the parent.

127 The Wi-Fi menu allows the parent to ensure that the Child's i-PAL is being monitored with the Parent i-PAL through its Wi-Fi capabilities. This is necessary if the child strays a distance from the parent and the parent has not set the boundaries for the trip.

128 The Menu Activity Screen is a very handy tool when adjusting the Tether technology.

129 The Child Portrait communication screen is a great resource when testing connectivity issues with the child as the parent can here the bells and whistles from the child's location to ensure all is working accordingly. This is especially helpful when a wardrobe transponder is showing static and the child may be bending it accidentally at school.

130 The Talk button contacts the child for open channel communication anywhere/anytime.

131 The Tether Status Lights always show green unless the child has bent a tether at school.

132 The Library menu of the i-PAL Network holds all of the programs and files that keep the family busy and entertained. This is also the location of the cherished files created by the children and shared amongst family members. Such treasures include art, books, cartoons, pictures, movies, and songs created and shared by the family. This menu holds licensing stores, utility programs for maintenance and configuration, and programs and files purchased by the parent and stored for easy access and assignment to profiles within the i-PAL Network. The i-PAL Library is constantly evolving around the family's needs. Licensing is managed for all applications and files through i-PAL by assigning use to family members to access programs and files from their handhelds or other i-PAL devices for as long as they require them and when finished or no longer needed, the programs and files are reassigned back to the Library where they will exist as archive material or traded back to the retailer for upgrades.

Software updates are received in the Library for applications purchased for the family. For web platform roaming profiles, software is made available for the child, adolescent, teenager, or parent so that the same files and programs used on the handheld can be accessed on public computers such as those in libraries, schools and colleges. The software cannot be accessed more than once, so the application must be closed on the handheld prior to logging on to the i-PAL Network computer at a library, school, or college and accessing the roaming profile. When the child logs out, the computer removes the cache files from the computer and the licensing falls back to the child's handheld. This enables a student to show his or her work at the library, school or college without having to worry about licensing concerns or attempting to share programs and files. This makes life easier for everyone. This also benefits the parents and other family members as they can use software from the Library in the same fashion for fun, hobbies, projects and work. The software is assigned to a family member and can be used at home, on the i-PAL handheld device, or at other locations that have an i-PAL Network login. For programs that are needed by everyone, a multiuse license can be purchased and added to the Library.

133 The Child 1 menu is where the child's i-PAL handheld is synchronized with the Library and programs and files are added or deleted, personal files and folders are collected for updating between the Library and the child's i-PAL, and settings are updated.

134 The Child 2 menu is for another child in the family. The Library collects all data during sync and protects masterpieces from changes made by the child by saving daily originals.

135 The Family menu contains the adult family members and their work is also saved in their own perspective sub-folders. The separation of the child and parent folders allows the parent to easily navigate through the Library. The parent can set the Library up in any design that is logical to the parent and add as many family members as desired.

136 The Art folder contains purchased programs and art files for use by the family.

137 The Books folder contains audio, electronic books, and programs for use by the family.

138 The Games Menu contains programs for developing hand-eye coordination, educational games, logical strategic games, and entertaining games enjoyed by the whole family.

139 The Logs Menu stores the i-PAL use logs for all network devices and applications. All licensing can be viewed by the parent here to ensure that there is software for all members of the family. Sync with licensing at the web platform level is also shown in these logs as failure, pending, or successful. Backup logs here allow the parent to see that the Library backup was successful to external drives or across the web to web storage. This menu provides confidence that the Library can be restored if needed. This folder cannot be deleted.

140 The Movies Menu contains purchased movies and programs for family use.

141 The Music Menu contains purchased music and programs for family use.

142 The Photos Menu contains Purchased programs and pictures for family use.

143 The Songs Menu contains songs composed by the family and stored here for safekeeping. This is a folder created by the parent to store the family's personal songs and lyrics.

144 The Video Menu contains home movies of the family. This is a folder created by the parent to store the family's personal home movies.

145 The Menu Activity Screen becomes a robust preview screen showing the myriad of files that include family memories and keepsakes created by family members and shared with all. This screen ties the previewer to the emotional bonds of the family.

The parent can create as many folders in the Library as desired. 143 and 144 are examples of folders created by the parent to safeguard the family created data. The Utility menu in the Settings tab allows the parent to backup whatever folder desired to safeguard the personal content of the family. This backup can be run to collect files and folders from the Library and back them up on an external device, removable storage disk, or web storage. Programs added to the Library can help the family create family albums that include personal art, movies, and music.

The i-PAL backup utility can back up the entire i-PAL Network to restore in case of corruption or unforeseen software issues from updates. The Library can be backed up as a separate entity as well as the profiles and core configuration. This allows the parent to restore where needed and when needed without disrupting the entire i-PAL Network. The Library should always be backed up in two ways: first, all licensed programs and files should be backed up to ensure there are no licensing mismatch issues, and second, all personally created files by the family should be backed up to DVD or Blu-Ray removable media for safe-keeping; or an external drive for just the family data.

146 The Monitor Perimeter screen is an always-on utility showing the Parent i-PAL and the Child i-PAL graphical locations with the parent at the center. When the live feed option is activated, the parent can see the live video of the Child i-PAL. This is a necessary tool when the child is in a store and out of site. This provides a map of where the child is in relation to the parent and a live video of the child's surroundings. When a child is at school or off with another family member or playing sports, the parent can use this utility to ensure the child is where he or she is supposed to be. If a child is in transit, this utility will alert the parent if the child is taking an unapproved route or has wandered in another direction entirely. The parent can tap the perimeter screen and tap record event, this can also be done in the live feed areas, to monitor suspicious activity or prove to the child that they were somewhere else when they say otherwise. The parent can tap the live feed and toggle between camera tethers if the child has one connected, which will give a better vantage than just the handheld camera. The camera tethers are usually shoulder height and give a better field of view. If suspicious activity is occurring, the parent can tap the record utility and the recorder will send all data logger information and audio and video to the Library for safekeeping. The parent can also tap the live feed and tap Talk to open the channel to the child and speak to surrounding people if there is a problem. Maps can be downloaded for the city in order for the parent and child to create safe routes of travel and places to avoid. This is done by tapping the perimeter and selecting approved routes and the parent can walk the child through as the route is drawn in. The perimeter menu is an overlay that does not disrupt viewing of the live feed or perimeter monitor.

147 The Child 1 Live Video Feed provides live video of the child's surroundings. If video freezes due to live streaming issues with the camera, the live feed can shunt to a camera tether that is part of the child's wardrobe that may have better signal strength due to static charging of the small device within the clothing. A backpack or jacket with additional battery storage can help improve live video streaming capabilities.

148 The Child 2 Live Video helps parents with more than one child. Instead of children running around the store, this utility can rein them in and the Tether can control their distance from the parent.

149 The Parent is at the center of the map. When a larger distance is needed due to soccer games or outings with school, the city map will always lock at the parent location and draw a line to the child for monitoring. This allows the parent to check in without disrupting the child's activities. The child's location is always known and mapped.

150 The child is represented as a dot that can be tracked by the parent when in smaller perimeter locations such as malls and supermarkets where it is important to keep the children near and safe. Cross hairs can be added or changed to the liking of the parent. Data fields following the child can be customized with more or less data. Tapping the child displays all information bandwidth strength, distance from parent, GPS, tether status lights, and much more as the parent requires.

151 More children can be added to the i-PAL Network and their live video feeds can be scrolled down to access. The map can show many dots at one time and the tether can control many children at one time. The stress levels of the parent are greatly reduced when this tool is in operation and the children realize there are limitations to straying off.

152 The Settings menu allows the parent to customize the i-PAL Network by configuring alerts, display settings, new devices to be added and removed such as tethers and handheld devices, setting up the live feeds and web platform for the roaming profiles, adding other computers to the i-PAL Network and configuring video chat software, texting and other Internet-based programs through the i-PAL firewall. There are many features that are robust and easy to configure in i-PAL and this is where it happens.

153 The Display menu allows the parent to move the Menu Activity Screen up or down for convenience. The Side screen will be grayed-out for the handheld units, but will be available on the personal computer and tablet i-PAL interfaces as there is wider screen property to better view the Menu Activity Screen. The parent can also customize skins for the i-PAL to give the screens and menus customized looks. These skins will include audio and video themed environments, which will be available for purchase and stored in the Library for the child to select to personalize her or his i-PAL environment.

154 The Menu Settings menu allows the parent to adjust access to menus and the appearance of menus. For children's menus in the Library, the parent can assign pictures or video and do this for most of the menus in the i-PAL Network. Access is set for either password protection in some folders and within a specified menu or locking the whole menu down or no security at all within the i-PAL Network; this is for access by authorized users within the i-PAL Network. The menus can be set to accept double tap or single tap or any combination to access the folders, subfolders and the menus within the i-PAL Network. Floating menus such as those found in the Monitor Perimeter and open channel screens can be changed to include more options or fewer options. The menu system is quite adaptable to the family needs and this utility is quite helpful in improving the organization and reflecting the personality of the family and their network.

155 The User Profile menu allows the parent to add and remove colleagues, family members, and friends from the i-PAL Network and web platform roaming profile so that access to family and files are granted and denied at the parent's whim. This is a wonderful feature when a child's friend moves away and won't be on the call list for the child anymore. If telephone numbers or other personal information change, but the parent still wants them in the i-PAL Network, this is where those changes can be made easily. All members are added to the global work group and are easily seen in the personal information managers used within the system so that everyone can email each other and share information as a group. I-PAL Smartphones, or handhelds, are setup by the service vendor with the family member's information. This creates a MAC address for the user in the i-PAL Network. The Parent has full control of the network and can setup the various components of the network including the Library and add devices as desired. When a member is added or removed, this is done in this menu and does not require a service provider. The MAC address adds a layer of security as it binds the user to the i-PAL handheld. The person's i-PAL truly becomes a personal device, as it is physically setup for that person. Network privileges are also configured here to add Internet, printer, or other access to the i-PAL Network.

156 The Network Settings menu allows the parent to see the full network map of the home i-PAL Network and view all connections. If there is a connectivity problem, this is where it can be diagnosed and repaired. When a new user needs to be part of the i-PAL Network this is where the new i-PAL handheld is added and set to synchronize with the network and the Library. The parent can use this menu to add a neighbor's child to his or her i-PAL Network temporarily while the neighbor is out paying bills or shopping. The child is simply added to the network and is monitored within the i-PAL Network. Tethers are part of the child's security model and appear as either connected or in sync with the child: green is good; amber is not so bad; red is not connecting and cannot sync. When the child prepares for school or outing in the morning the i-PAL handheld connects to the tethers that the child wears as sewn-in or worn devices. If a device no longer works, it will show up red and the parent will have to replace it or its battery. Other networked peripherals are viewed giving the parent a full picture of the i-PAL Network.

157 The Devices Settings menu allows the parent to add devices to the i-PAL Network such as cameras, printers, scanners, and other peripherals that the child may require. Tether devices can come in any size and shape as clothing or accessories to the child. They are devices that need to be added to the i-PAL Network in this menu.

158 The Personal Computer i-PAL Interface menu adds family personal computers to the i-PAL network so that the parent or child can work from their handheld or a personal computer with a bigger screen. Once added, the child, or parent places their handheld i-PAL next to the personal computer and the i-PAL screen loads on the personal computer for the child, or parent to work. The child interface removes access to the personal computer's task bar and internet connections and simply allows only the i-PAL environment to be available. This protects the child from straying on the internet and viewing sites that can be harmful to development and locks attackers out as they cannot access the encrypted environment or infect the child's profile using the internet. A tablet will be a common accessory as it can offer more storage space for software and files and provide the child with a larger viewing area for detailed study and like the handheld is quite portable. The tablet is added in this menu and a screen appears on the tablet from the i-PAL Network. An installation process occurs where i-PAL is installed as an always on application. The child logs in to the environment and taps the sync button. All of her or his files and programs appear just as it exists on the handheld. The child can pocket the handheld and enjoy all of the i-PAL benefits on the tablet. The i-PAL handheld can never stray from the child as it will set off the Tether Alarm. The tablet helps the child work on more things, but does not replace the security of the i-PAL handheld unit. This menu also removes the interface from personal computers no longer being accessed.

159 The Live Feed Settings menu allows the parent to view the settings and condition of the live feed cameras. A child may have several tether cameras on their person as they take up very little space on the wardrobe and this menu tests connectivity and diagnoses problems. If a live fee is damaged or full of static due to moisture, it can be turned off from here. The parent can set record mode options or have the live feed camera start at scheduled times to check up on the child. Backup of live feeds can be set to local or offsite storage by the parent if they are using web storage to safeguard data.

160 The Sounds Settings menu allows the parent to configure sounds for the various activities of the i-PAL Network. This includes sound levels and on/off switches. This is a good feature if the parent is attending meetings at work or must have a quiet i-PAL handheld in church or other quiet settings. Call tones and sounds including vibrating rates can be adjusted and personalized for each individual member of the i-PAL family.

161 The Alerts Settings menu allows the parent to adjust the alarms to vibrate or make sound. The parent can also adjust the sound levels for various alarms. The difference between this menu and the Sounds Settings menu is that it allows the parent to see the alerts that are active and select what constitutes an alert and what sound or vibratory rate will be assigned that alert state. If the parent has selected to turn off the sounds of the i-PAL handheld during an office meeting and an accompanying report debriefing, the Vibrate mode will alert the parent when activity is occurring that require urgent feedback: child has strayed from authorized route coming home, school was let out early and the child is waiting for pickup, child is calling for open channel to be picked up, teacher is calling to report a sick child. Such urgencies require immediate or timely action, and the Alerts Settings menu can be configured to provide urgent real-time alerts to get through the day.

162 The Internet Settings menu allows the parent to see the connectivity status of the i-PAL Network to the Internet, see the web platform roaming profiles and their accompanying software licenses and profile settings, see the firewall traffic and logs to ensure that the i-PAL Network firewall is functioning properly, ensure that Internet temp files and folders incoming cookies are being deleted daily, verify settings for video chat software, and other web-based programs used in the network, and rotate the encryption settings for scheduled sync with all i-PAL Network handhelds; should be done once a moth to keep the encryption levels tight. Ensure firewall logs are backed up to DVD or external storage; this is important if there is an intrusion the culprit will be in the logs. This is also where the firewall is configured to allow programs access through secure ports.

163 The Utilities menu has i-PAL tools that allow the parent to test the firewall, scan the i-PAL Network for vulnerabilities and corruption, Remove temporary files and folders left behind during sync with handhelds; also cleans handhelds of lost files and folders that just take up space. The diagnostics tools help resolve problems with devices, connectivity issues, and other i-PAL Network issues. The backup utility allows the parent to set storage schedules for backups to local locations, off-site locations, or removable media.

164 The Reports menu allows the parent to create customized reports of all logs and data occurring in the i-PAL Network. Data Logger files can be collated into customized reports, but the data cannot be altered or deleted.

165 The Menu Activity Screen is quite useful in the Settings menu as there are many settings to be modified in this simple interface.

166 The Security menu allows the parent to secure the i-PAL Network and to make changes to the environment so that i-PAL works successfully.

167 The Event Logs menu does not copy logs to the Library Logs folder, as these are located in a secure location within the i-PAL Network. Normal daily logs can be customized to purge after six months, or other intervals, or backed-up to another location for archival purposes. Events that are not normal are flagged by the system and Alerts are generated in the i-Pal Network Status screen.

168 The Encryption Settings menu allows the parent to adjust the encryption state of the i-PAL Network. Changes made here are synchronized to all devices on the i-PAL network. This is used when there may be an issue with security and the parent can easily reset the encryption. The encryption does not affect the child's, or parent's connection to the i-PAL Network, but keeps the network secure from outside interference.

169 The Data Logger menu collects Internet Protocol addresses and advertised Machine Access Control addresses from devices close to the Child's i-PAL as a means of security surveillance. If a person or vehicle carrying a handheld or using an IP address approaches within proximity of the child, the Data Logger of the Child's i-PAL records the event. In the Security menu, the parent has the ability to view the Data Logger for event dates and times. If a person or vehicle has approached the child more than twice during the week, an alert is sent to the i-PAL Network Status screen for the parent to research the person or vehicle. A ping utility can be performed that display, on the Monitor screen, the location of the person or vehicle; if close by. If the person is a parent at the park, or a neighbor, or someone that is frequently seen, then the parent can clear the Alert and click Authenticated next to the IP address and add the person's name if desired. If the vehicle is parked in the neighborhood belonging to a neighbor, then it too can be authenticated. This is a tool to keep stalkers from planning to harm a child. This is an excellent tool for visiting the park with the children and an alert pops up. People that are familiar with the parent can be easily authenticated and those new people can be left for later speculation and a formal greeting. Before going to a mall, park, or plaza with the child, the parent can set the Data Logger to suspend alerts for an hour or more; the Data Logger can only be suspended for short intervals up to four hours. This allows the parent to take the child on an outing without the i-PAL Network generating alerts for all unknowns encountered. The Data Logger will continue to record IP addresses and advertised MAC addresses, but will not generate alerts for them.

170 The Security Encryption Sync utility synchronizes the i-PAL Network when changes are made to the encryption state. The parent makes the changes to the Security menu and taps the Sync button to finalize changes.

171 The Data Logger Alerts menu stores alerts until deleted. Once the parent authenticates a person or vehicle the alert is deleted from the list. This allows the parent to see how many alerts have been generated and decide to control the child's Tether to minimize the Alerts generated or be wary of an unknown repeat person or vehicle.

172 The Authorized Users menu displays those users allowed access to the i-PAL Network.

173 The Authorized Devices menu displays all devices that have been added to the i-PAL Network. This also includes the child's pendent, watch, backpack or hat, that the Child's i-PAL associates tether connectivity. If the i-PAL is thrown from the child at a distance that severs connectivity, the i-PAL will squelch a high burst sound that will start to emit low and then build to an increasingly higher pitch. This is a warning either that the child has left behind the i-PAL handheld or that the child has been absconded with. The pendants, watches, or backpacks are added to the i-PAL Network in the Settings Devices menu. A line of children's apparel can also suffice for the child's tether to the i-PAL; as long as they have the waterproof transponder hardware sewn in. This menu also includes camera, printers and scanners attached to the network.

174 The Authorized IP Menu displays the authorized devices that have been assigned IP addresses that can interact with the i-PAL Network.

175 The Authorized Personal Computer menu displays the personal computers that can interact with the i-PAL Network including tablets.

176 The Video Capture Live Feed menu displays the storage capacity for the live feed data and options for saving to external authorized locations within the i-PAL Network.

177 The Audio/Video Upload menu allows the parent to set the time intervals before the Child's i-PAL uploads all security data to the Parent i-PAL or i-PAL Network location. The parent can configure new locations. The child's i-PAL will send all security surveillance information to the parents designated in this menu if the i-PAL is untethered or if the child presses the Tether Alarm button within the Child's i-PAL Tether menu.

178 The Emergency button is for the Parent i-PAL. If harm is to come to the parent, this option activates the Parent Tether Alarm. The parent can adjust this button access through the Alarms menu of this folder. If someone comes at the parent in a form of hostility, the parent can immediately access the Tether Alarm button on the Desktop, if logged out, and the Security menu by double-tapping Emergency button. The Parent i-PAL will lock down and all security information will be transmitted immediately to another family member or secure location. The Squelch will be heard one thousand feet away and the black screen will have a red strobe pulsating to alert witnesses.

179 The Menu Activity Screen for the Security menu is a clear window into the workings of the Security folder where logs can be viewed; authenticated devices, IP addresses, MAC addresses, and users can be viewed and scrutinized. The screen affords a huge viewing area for the myriad of information stored here.

180 The Personal Computer i-PAL Interface is just like the Parent's i-PAL handheld. The exception is that the screen is wider and the entire Menu Bar is visible without the need to scroll across.

181 The eStore menu allows the parent to purchase from a huge selection of vendor provided media for the child and the parent. When purchased from this menu, the items are stored in the Library for disbursement to family members within the i-PAL Network.

182 The Update menu allows the parent to select specific updates to install and uninstall from the i-PAL Support site.

183 The Support menu allows the parent to access frequently asked questions regarding i-PAL, troubleshooting techniques and iChat with a technical assistance provider; specified plans may vary for technical support.

184 The Menu Activity Screens are now wider and offers a nicer preview for menu activities and processes. In this environment, the admin\parent can work on two profiles at one time instead of having to work one at a time with the handheld due to viewing space limitations. If the admin\parent only needs to focus on one member of the family, than a a left click on the family member's name banner will open the screen to that member's profile for management.

185 The Standard Login Screen is required in the mornings to prepare for the day and make sure that the i-PAL handheld is in sync and schedules are viewed. This is an excellent time to update scrolling marque schedules for the day. This login screen is to secure the i-PAL from strangers or children that want to play. Login is also required when the parent is working from the Desktop and wants to re-enter the i-PAL Main Menu by tapping the iPAL link on the Desktop. When the child reaches an age where he or she can understand the username and password concept, this feature can be added to the Child's i-PAL. This will be a nice feature to keep brothers and sisters from invading their sibling's privacy. This is also a good way for the child to secure the i-PAL from children at the Dojo, in the neighborhood, in the park, or at school.

186 This is the handheld status section containing wireless vendor logo, 3G connectivity, connectivity strength, and Internet time. On the PC, only Internet time will be shown.

187 This is the i-PAL Welcome Screen for the standard user. Just like the Admin Welcome Screen, this section can be tapped or clicked to enter the standard user Main Menu. There is no button for this as a safety element to protect the i-PAL Network and user profile. The Taps can be configured in the Menus menu of the Settings tab.

188 The i-PAL Logo Watermark covers the Portrait Communicator while offline.

189 This is the i-PAL Portrait Communicator that is currently offline.

190 This is the standard user Login Section.

191 The standard user login ID screen uses a floating menu that mimics water being touched. The user taps the screen and a touchpad appears below, on a handheld, to enter the appropriate user ID. The family member must have been added to the i-PAL Network as a standard user prior to using this screen. There is no difference in procedure between the handheld and the PC or tablet. An updated feature is the web platform that allows the standard user to login, which authenticates the handheld and the web profile.

192 The Password screen taps like water, and drops a floating touchpad, on handhelds, to type in an alpha numeric that cannot resemble the user's name nor have similar characters.

193 The i-PAL Family Member Name banner holds the login user's name to show the user that the login was successful.

194 The Internet Time is located here to keep track of schedules. Alert messages appear as floating messages in the child and parent profiles to keep the family member aware of pending appointments, but the clock is left here in the Activity screen so that more things can be done in the profiles menu system with less stress or distraction.

195 The i-PAL Welcome screen section welcomes the family member and serves as a tap out to the main profile. This screen is always accessed either from the Main Profile or the Desktop. Desktop access to the Activity screen requires another login.

196 The i-PAL Logo Watermark is used as a privacy screen for children and parents when they do not wish to be disturbed by video communication and want quiet time while working in their profile. The parent or other family members can always open a channel to them and talk to the family member if urgency is required.

197 The i-PAL Portrait Communicator is the video communication tool to all family members and friends. It can be set to privacy using the i-PAL watermark or other pictures or graphics or the family member can replace their picture with scrolling pictures or video of other subjects. This allows the family member to customize their interface to their hearts content. It also allows them to experience a truly personalized environment.

198 The Today's Activities screen section displays all activities scheduled for the day.

199 The Today's Schedules displays the many activities set for the day. Each elliptical screen can hold many elements and each elliptical screen can represent one genre for the day. This allows the student to schedule things for school, when school is out, around the house, and projects at home. This is a good organizational tool for kids.

200 The Tether Add/Sync button allows the family member to sync up for the day with personal tethers and make sure that what they are wearing is talking to i-PAL.

201 The Tether Add/Sync Progress bar allows the family member to see the sync progress.

202 The Numbers for Schedules buttons are called Index Taps and are used with the elliptical screens to scroll up and down the menus by tapping left or right of the elliptical screen and then tapping the Index Taps to progress. When an appointment or goal has been achieved, the family member taps the item and a floating menu appears below with options. When an appointment or goal has been achieved, it is noted in a log and sent to the Library under a category of achievements. At the end of the year, the child or parent can see all of the achievements made during the year and print out a certificate for the wall or album. This is a very enjoyable self-esteem building utility.

203 The Tether Status Lights indicate to the family member that they are green and ready for the day.

204 The Parent Call List has all family, friends and business colleagues listed for quick calling. Unlike the child interface, the parent can add to the call list through the Communicator Portrait menu.

205 The Art menu has programs and files for the parent to enjoy.

206 The Books menu has a collection of audio, eBooks, and files to for research or pleasure.

207 The Camera menu allows the parent to take pictures when needed.

208 The Games menu allows the parent to test wits against digital opponents.

209 The Movie menu allows the parent to watch a movie or two during the day.

210 The Music menu gives the parent a relaxing musical session from work.

211 The Diary menu allows the parent to take notes during the day and set goals.

212 The Tether Alarm button is tapped twice to enter the arming screen and a single tap from there. This is a precautionary button used in case of emergencies. Once the Tether Alarm is set the handheld becomes a siren heard a thousand feet away and will transmit all data from fifteen minutes up to the web profile and back to the i-PAL Network Library or wherever assigned for safekeeping.

213 The Menu Activity Screen allows the parent to view menu items in a convenient location.

214 The Open Channel Screen is a communications powerhouse with many options.

215 The Tal button allows an open channel to anyone in the call list.

216 The Tether Status Lights allow the parent to see the condition of her or his tethers.

217 The iPAL link takes the parent back to the Activity Screen.
218 The Desktop link takes the parent to the Desktop of the computer or handheld to take on-line college courses or surf the Internet or whatever is needed. If an emergency occurs the Tether button is also linked here as well as the iPAL link back to the Activity Screen. I-PAL is always on even in the background allowing the parent to feel confident that the interface is always just around the corner.

The Child's Main Menu is the place where the child will see all the programs and activities available in the i-PAL Network. This is the main screen for the child and has all of the menus needed to do anything the child will require. The main screen scrolls up and down with active touch screen technology; scroll bars appear on devices not using this technology. The Desktop is off limits here. The Internet access is restricted as well unless the parent allows access in the Settings menu. Programs with internet access will have filters to restrict content for the child. The menu is fully expandable and the parent can add many local and Internet-based applications for the child to use during the day.

219 The child's Call List is located here at the top of the screen. The graphical representations shown here are of family members and friends that have been added to the child's Call List and will be seen as photos easily recognizable by the child for easy tap and call activities. The child can tap a family member or the Portrait screen where the child can select options for video chat software and texting.
220 The Art menu has Art programs and files for the child to explore.
221 The Books menu has audio, electronic, and files allowing the child to practice writing, read a story or two, and learn a different language. It is also a great place to write new stories or work on school work and use the vast resources in the menu such as dictionaries and thesaurus to build a better paper for school or work on a project that is personal and inspiring. This is a great menu to get lost in and build new worlds to explore. The parent has to set up the on-line Library through a secure portal so that the student can log in to the public library or Universities for more resources.
222 The Camera menu allows the child to use the camera built in to the handheld and take pictures and create photo studies that can be captured in software that has been installed by the parent so that the child can express new ideas and make her or his photographs brilliant with detail and imagination.
223 The Games menu allows the child a little frivolity and the ability to build hand/eye coordination using education, entertaining, and mind expanding games that the parent has assigned the child.
224 The Movies menu allows the child to carry his or her favorite movies wherever he or she is going. The menu also has programs that allow the child to use the camera on the handheld and make movies that he or she can share with the family.
225 The Music menu allows the child to express creativity through music. This menu has the child's favorite music to take anywhere and programs that allow the child to experiment with different tones and octaves and try out new instruments that sound amazing to the child. This menu can lead to future musical invention of sound.
226 The Diary menu allows the child to compose her or his thoughts in a daily diary to keep track of those special moments in life that need to be remembered. The diary accepts pictures, movies, speech and writing so the child can customize how memories are expressed and saved in the diary. A great place to express one's thoughts.
227 The Tether Alarm button is always available just in case of emergencies. This is a double-tap button that leads to a full black screen with a single-tap red button. If the child feels threatened, a single tap locks the handheld unit down and uploads the last fifteen minutes of data up to the web profile and into the home i-PAL Network. The handheld begins squelching a high decibel screech that is heard for a thousand feet away. Only the parent handheld in proximity to the child's handheld can turn the squelch off and unlock the handheld.
228 The Menu Activity Screen is where all menus can be easily viewed without leaving the interface. A wonderful place to read books, make movies and play music.
229 The Communication Portrait allows the child to receive open channel communication from family and friends and make calls to the Call List. All communication can be audio, text, or video.
230 The Talk button allows the child to tap a family or friend member on the Call List and tap the Talk button to instantly connect to that person.
231 The Tether Status Lights allow the child to see the condition of his or her tethers.
232 The iPAL link takes the child back to the Activity Screen to check time and schedules.
233 The Call List is present in the Art Menu so that the child always has the capability of calling family and friends.
234 The Art Menu contains all the art programs and files the child may need. Because the i-PAL Network is designed around the family, the system has been designed around the use of children, adolescents, and teenagers. From basic programming to very sophisticated program tools can be loaded on the i-PAL handheld and associated tablets using this i-PAL environment to create on a range of preschool to college level engineering. There is no limit to what can be accomplished with the i-PAL Network.
235 The Back to the Main Menu link is always present to allow the child to go to the main menu whenever needed.
236 The Painting menu allows the child an assortment of painting programs and files to learn how to paint in various styles and develop a comfortable approach to recreating what is seen in digital paint.
237 The Sketch menu allows the child to develop an eye for sketching in various weights of materials. The programs and files in this menu allow the child accurate mimicking of the use of chalk and leads to create masterful sketch work.
238 The 3D menu allows the child to create realistic designs from animals to cars using special software and files within the menu that help the child step by step through the design process to the final creation.
239 The Toon menu allows the child to create wonderful animations and experience the world of creating cartoons and anime creations using the programs and files within the menu.
240 The My Art menu allows the child to view the creations that he or she has created. The child does not need to enter the various programs to see their work as all work is saved to this folder for synchronization with the i-PAL Network at home.
241 The Tether Alarm button is in this Art folder as all other folders. The child will not see this button or this menu while working in the programs designing creations from his or her imagination, but when an emergency occurs the child can tap out of the program at any time and double-tap the button. I was going to place this only in the Main Menu, but considering how time consuming some art can be, I decided to place the locked button on all of the menus for the child's safety.

242 The Menu Activity Screen will be a joy to view all of the art work in this menu.

243 The Open Channel Screen receives calls from family and friends too.

244 The Talk button gives the child the ability to talk to family and friends or ignore them and keep working, Parents can always override such behavior with the Open Channel.

245 The Tether Status Lights are present here, but are not seen in the various programs once entered by the child. A tap out of the program brings the child back to this menu.

246 The Child's Call List is in the Book menu so that the child can always be in reach no matter where he or she is. In this case, the child could be reading a nice story and want to share the story with a friend or relative. This is a very handy feature for the child.

247 The Book menu is a wonderful place for children. This menu can read children to sleep, teach them new words, teach them new languages, and allow the child to create new literature that can be shared with other family members.

248 The Return to Main Menu link is always available to easily navigate back to the beginning. This is nice for adding to the diary or trying another menu.

249 The Audio menu allows the child the ability to choose books within the menu and listen to them as they are read with expressed emotion and feelings from characters that are rich with depth and personality. As the child listens to the stories, mental characters are created from faraway places allowing the child to experience adventure and discovery. This obviously wonderful learning tool is also a great parental gift that can read a child to sleep at night. Parents will enjoy this feature tremendously.

250 The eBooks menu allows the child to select electronic books of interest and to read the books to either the parent or to self. This is an excellent menu for discovering new beautiful places, new adventures, and new worlds of exploration.

251 The Text menu allows the child to view whole books in text form to read as if reading a book. Unlike the electronic books which have pictures and diagrams, this menu has books that are mainly literature and designed to read without illustration. This will be a good area for a teenager to delve into the Iliad or research authors from every genre.

252 The Apps menu provides the young reader with writing tools and learning tools. The child can learn new languages and write in them as well. An adolescent can hone a solid script together to show family and friends, and a teenager can publish his or her first article, book, or paper. This is a wonderful menu to motivate creative minds.

253 The My Writing menu allows the child to view his or her work without having to enter the program that helped craft it. This way the child can preview the work and decide on different avenues to change the concept to go in a different direction. The originals are always kept in the i-PAL Network Library for safekeeping just in case the child does due a 180 degree spin on an idea.

254 The Tether Alarm is in the Books menu just as a safety precaution and does not detract from the many books and manuscripts available to read in this menu.

255 The Menu Activity Screen will not be enough for this menu and the child will often have the full screen up reading over old works by gifted authors or watching a story unfold.

256 The Open Channel Screen is always available for friends and family to keep in touch.

257 The Talk Button can be ignored, but not when a parent is calling.

258 The Tether Status Lights keep the child secure when all is green.

259 The Child's Call List is always available to share pictures with a family member. Just tap a Call List photo and tap the Portrait Screen to select Send A Picture from the floating menu. When the family member or friend receives the picture they can open-channel and their face will appear in the Portrait Screen with either live video or their Call List picture and they can congratulate the child for a job well done.

260 The Camera menu allows the child to use the camera features of the handheld and other devices to capture photographs for use with programs in this menu to create imaginative and unique artwork, designs, funny creations, and just have fun taking pictures.

261 The Back to Main Menu section returns the child to the Main to tap iPAL and see what Activities are going on today. This is a great way to navigate through the profile.

262 The images menu holds all of the original photographs taken by the child. This is where the child borrows copies to be used with programs to make new ideas come to life.

263 The Photography menu allows the child to use programs provided by the parent to edit, paint, add sounds & music to pictures, and just have fun with pictures taken by the child.

264 The Learn menu teaches the child about the development process for using film to take pictures. This is also where the child learns how a camera works and the history of the camera. This menu also teaches about shutter speeds and how to contrast pictures or take sharp crisp pictures from far away. This is a great dictionary of Photography in one simple menu. The programs here are fun and thought provoking.

265 The ideas menu is where the child uses knowledge from the Camera menu to create professional pictures using camera devices added to the i-PAL Network that use Wi-Fi to send pictures from the camera to the handheld to be stored in the My Portfolio menu. This menu has tools that allow the child to simulate darkroom, add lighting effects, manipulate camera settings and shutter speeds to tweak the pictures to perfection.

266 The My Portfolio menu contains the work of the child and the unique style adopted by the child in expression through the lens of the camera. All work from programs in this menu is saved here for the child to view and for the parent to admire and show pride in the child's eye. The child will grow through inspiration and creativity from this menu.

267 The Tether alarm will offer protection to the child while taking pictures of the world.

268 The Menu Activity Screen is essential for the child shutterbug, as the menu becomes a photo and film development lab. The child will take many pictures and spend many hours within this menu.

269 The Open Channel/Portrait Screen offers family members to see the child that they wish to talk to and for the child to see them. This is a wonderful looking glass to the family.

270 The Talk button opens the communications channel to those in the Call List.

271 The Tether Status Lights ensure that the child is in a good state with tether technology.

272 The Call List is also in the Games menu and may well become quite intrusive to young gamers who are enjoying a bicycle race or flying a glider just to have friends and family interrupt their fun. This is an excellent reason for having the call list in the Games menu and a good way for parents to develop time intervals for specified games; primarily in the Action menu.

273 The Games menu provides more than just entertainment to the child. The parent provides educational programs that engage the child in challenging, skillful, and creative activities that assist the child developmentally in the areas of critical thinking, leadership, problem solving, and reasoning endeavors. The entertaining games are fun too.

274 The Back to Main Menu link is always available in the menus as a way to easily navigate back to the beginning in order to update the diary or quickly research something in the Books menu for homework that is due tomorrow.

275 The Action menu is all about quick response and using mental and physical agility to reach the finish line. This menu has many action-packed games loaded for the child, by the parent, to keep the child's hand/eye coordination at their finest.

276 The Clever menu is where the parents place puzzle games and strategy-packed games that will keep a child guessing until the end. These games offer a balance of mental agility and deep forethought. This is a good place to learn logical thinking and discovering how others think in the problem solving arena.

277 The K-12 menu has all of the programs necessary, for the child's age development, to achieve honors in school and to develop with the pack or excel past the pack. This is a very useful menu as it teaches the child what is being taught in the classroom at an accelerated learning curve.

278 The Apps menu is where the parent places in the child's hands an arsenal of applications designed to teach the child how to build gaming modules and create their own puzzles and gaming platforms all in the comfort and security of their i-PAL Network. The child can build and test levels and create meaningful characters that can be added to games and then developed to an end model for distribution to family and friends for their enjoyment.

279 The My Scores menu collates all scores from the many programs into this menu so that the child can view progress. The parent can view the child's performance as well and compare with national standards across a wider audience. These scores are collected during the sync cycle and stored in the i-PAL Network Library.

280 The Tether Alarm is a locked button in this menu and is available in case of emergency.

281 The Menu Activity Screen will be quite useful here as there is a lot to do in this menu.

282 The Open Channel Screen is always available for the parent to talk with the child.

283 The Talk Button is an easy tap to any family member or friend.

284 The Tether Security Lights offer assurance that the child's tethers are functioning normally.

285 The Call List is easily available to the child as with all menus so that open communication with family and friends are always available.

286 The Movies menu allows the child to experience favorite movies and movie making magic, storyboarding, and script writing. This menu will spark imagination.

287 Back to Main Menu link is as simple as a single click to the beginning.

288 The Movies menu contains all movies provided by the parent for the child to enjoy.

289 The Magic menu contains programs that have been assigned by the parent from the Library and made available to the child on her or his handheld. These programs allow the child to experience blue screen editing, special effects wizardry with film and create personalized videos for the family to enjoy. The Program menu allows the child to explore new visual horizons and creative expression through movie-making magic.

290 The Family menus is where the child makes movies with his or her camera built in to the i-PAL handheld and uses special effects and other tools to make the video wonderful. These home movies are saved to the Library during the next sync cycle for safekeeping.

291 The Ideas menu is where the child scripts together a play, a film idea, or a storyboard to use in a creation that the child has dreamed up. This is a wonderful way for a child to find self-expression and to create something from imagination and bring that imagery to real life in film and script. Ideas that flourish enrich us all.

292 The My Scripts menu is where the programs used by the child store all work created by the child. The child can preview all work without opening the associated programs and see her or his ideas take shape. The parent can also review this menu and send messages to the child to compliment him or her on a job well done.

293 The Tether button is locked and ready in case of emergency.

294 The Menu Activity Screen will be a comforting place to view home movies and theatrical movies; it will be as though the user has a personal box office seat by which to watch her or his favorite movie, play or opera. This is also a nice are to view the child's creations in full color to see what has been imagined and how the child expressed this creativity. A double-tap brings up full screen and another tap brings the screen back to normal.

295 The Open Channel Screen/Portrait allows the child to share movies created in this menu by tapping the Call List and selecting one or more members and tapping the Portrait Screen and selecting Send Movie. This is a quick way to get feedback and a wonderful way to brighten someone's day while commuting or busy at work. This is a wonder way to share memories to the family.

296 The Talk button is tapped when a picture of the family member appears in the portrait screen and the child taps the Talk button to open channel to the family member.

297 The Tether Status Lights keep the child safe and ensured that everything is working great.

298 The Child's Call List in the Music menu allows the child to call a family member or friend and play a song he or she created for feedback. This can also be done in the Art menu and the Books menu.

299 The Music menu allows the child to listen to music, learn about musical instruments and their sounds and develop inspiration to create new music to share with family and friends.

300 The Back to Main Menu allows the child quick navigation back to the beginning.

301 The Music menu allows the child to listen to music that the parent has provided.

302 The Instruments menu is where instrument applications allow the child to try out instruments and listen to the sounds they make and the various octaves they are known for. This affords an appreciation of music and the instruments used to make the sounds.

303 The Learn menu allows the child to use programs provided by the parent to learn how to write music and understand the symbols and sound levels used in making music understandable and enjoyable. The child will learn the language of music and apply that knowledge to various instruments that make appreciable sounds and melodies.

304 The Ideas menu allows the child to put the knowledge to music and create sounds that have not been heard before or melodies that are different and unique. The child will have learned music and can now apply that knowledge to create original masterpieces to share with family and friends.

305 The My Songs menu is where the applications in the menu place the work of the child for preview without the necessity of opening the applications that helped produce the music. The parent can also preview the work and make notes for the child to hear upon entering this menu. All work saved here is automatically saved in the i-PAL Network Library for safekeeping upon the next sync cycle.

306 The Tether Alarm button is locked in this menu and available in case of emergency.

307 The Menu Activity Screen is a wonderful place to see music as it is created, adjust musical layers, or tracks, and write songs and melodies that will be cherished by the family. The family will find great appreciation in the creations thought from the child.

308 The Open Channel Screen is available for communication and plays notes left by the parent regarding music and work found in the My Music menu.

309 The Talk Button allows the child to share music with family and friends as he or she is creating it. This is a great feedback resource as knowledge is shared between family.

310 The Tether Status Lights assure that the child has working tether technology in case of emergency. Green light is GO light.

311 The Tether Alarm is the safety device for the i-PAL Network family member. This is not a menu, but an active alert system. The user must be instructed on the use of this feature. Unlike the Tether Status Lights and Alerts warning that the child has damaged tethers or has strayed too far or that the child has left the i-PAL behind, this feature of the Tether is for audible/data defense. In order to get to this screen, the user must have tapped the Tether button twice. The parent can adjust the number of taps needed in case it has been used accidentally, and the child needs to get used to the interface. This is done in the Settings tab. The initial screen is black with a red icon. To leave the screen requires a single tap anywhere, but the red Alert button, taking the user back to the menu screen.

312 The Alert button is big and red and it requires a single or double tap activate; again, adjustable in the Settings tab as the parent can adjust the number of taps necessary. Ideally, if there is an emergency, the faster the squelch is activated the better for the child. Once the Alert button has been tapped, the i-PAL handheld locks down and emits an powerful emergency squelch, which can be heard for a thousand feet. All security data, including audio, Data Logger data, and video for the last fifteen minutes, are uploaded to the family member's web profile and then downloaded into the home i-PAL Library for safekeeping. All family members are alerted to the emergency immediately. No one can turn the squelching i-PAL handheld off except for the parent. The parent or other family member has to come to the location and the squelching handheld will receive sync with the family member's i-PAL handheld and stop squelching. Only a parent i-PAL can unlock the unit once this has occurred; this is done in the same manner by proximity to the unit. Pressing the Alarm button is different from walking away from the unit as it requires a parent to unlock.

313 The Tether Menu Activity Screen emits a red strobe signal light to attract witnesses.

Note If a child or other family member taps the Alert button in this screen while in proximity to the parent, the parent has three minutes to login to the handheld to stop the process; this is adjustable in the Settings tab. The parent will see that the i-PAL handheld only displays the login screen when the other family member unit is squelching. If the parent logs in to her or his i-PAL handheld the squelching process stops. If a parent is in trouble and being assaulted and the child taps the Alert button, the parent i-PAL handheld will also lock down and begin the alarm process. This doubles the sound and amplifies this incident. The suspect will have to flee. The parent will have to call another family member to that location to stop the squelch. This is a little inconvenient, but it can save lives. An update to this feature may involve a Squelch Clear button in the roaming profiles, but that is in the future and we are not there yet.

314 The i-PAL Family wearing transponders connecting to the i-PAL Network.

315 The transponder watch can be any commercial watch with a transponder circuit attached to either the back of the watch or to the band of the watch. The device is added to the network and communicates periodically during the day for synchronization. The tether signal is constant. If the device is separated from the i-PAL Network without being disconnected by the parent, the i-PAL tether alarm sounds off and data is eventually uploaded to the assigned receiver. While no longer communicating to the i-PAL Network, the transponder continues to broadcast an emergency packet, powered by static electricity, that can be picked-up by a police officer, other i-PAL Networks, and commercial outlets with the i-PAL Array enabled. The Array is just an i-PAL receiver, or transponder, used by a store to help locate missing children. When the packet is received, the IP address and personal information of the owner is relayed to inform authorities of the transponder's emergency state and ascertain a resolution.

316 Transponder luggage can offer extra security at the airport or during vacations as the luggage can be set to alarm if separated from the owner. Once the luggage is ready for stowage, the parent can check the luggage for sleep mode or turn the tether off entirely.

317 The belt can have a transponder attached to the inside of the belt for security purposes. The reasoning is that if the parent or child is injured and obsconded with, the belt can still broadcast the tether signal to surrounding devices. A police officer in his or her patrol car may receive the signal as a vehicle passes them on the road and have the right to pull the vehicle over to ascertain the situation. A malfunctioning transponder will just turn off as it will fail its redundancy check. A broadcasting tether transponder no longer connecting to the i-PAL Network is serious in nature and the packet broadcasting ability will allow authorities to know who's device is broadcasting in case the driver shows an identification card differing from the transponder Emergency Packet ID.

318, 319, 320, 321, and 322

Transponders woven into the material of shirts, blouses, trousers, jeans, and dresses are powered by static electricity and essentially run perpetually until damaged from washing, tearing or being worn out. The user will know when the transponder is no longer connecting because it will not tether to the i-PAL Network. Time to toss out and purchase a new one to sew back in. Apparel transponders are important as they are worn by the user. If a child was obsconded from his or her bedroom while the family slept, the transponder in the blanket, dress, or bracelet will alert the family immediately when the connection is severed from the home i-PAL Array and the child's various transponders will alert nearby networks that they are sending emergency packets.

323 The transponder bracelet could be a decoy or actual transponder run by static electricity.

324 The transponder shorts has a transponder woven into the material.

325 The transponder shoes has a transponder attached or woven into the material.

While the present disclosure has been described in connection with what is considered the most practical and preferred embodiment, it is understood that this disclosure is not limited to the disclosed embodiments, but is intended to cover various arrangements included within the spirit and scope of the broadest interpretation so as to encompass all such modifications and equivalent arrangements.

What is claimed is:

1. A system at least partially enabled by one or more processors comprising:
    a first device having a display for displaying a selected content item made accessible to the first device via download and/or streaming from a network, the first device having a first device input to interact with the content item, and configured to make changes to the content item;
    a second device coupled to the network and configured to control access to and/or to monitor the use of the content item by the first device;
    a module comprising a processor and heuristic software which when implemented by the processor determines whether the first device has utilized the content item to a level of utilization greater than a predetermined value, and provides a suggestion if the level of utilization is greater than the predetermined value; and
    a communication module to send the suggestion to the second device to provide the first device with an updated and/or a second content item; and
    wherein the first device is configured to save the changes to the content item, at least temporarily, to a memory resident on the first device; communicate the changes to the content item to the network;
    wherein the network is configured to communicate the changes to the content item to the second device; and
    wherein at least one of the network and the second device is configured to save the change to the content item as a revision of the content item to one or more additional memories resident in at least one of the network and the second device.

2. The system of claim 1, further comprising a second device input to approve the suggestion, and to cause the updated and/or the second content item to be made accessible to the first device.

3. The system of claim 1, wherein the level of utilization is determined by the one or more processors based on education criteria.

4. The system of claim 1, wherein the level of utilization is determined by the one or more processors based on a use rate indicative of an interest level.

5. The system of claim 1, wherein the level of utilization is determined by an input made with the first device input.

6. The system of claim 1, wherein the suggestion is made at least partially based on a previously completed set of subjective questions.

7. The system of claim 1, wherein the first device and the second device are respectively a first and a second smart phone.

8. The system of claim 1, wherein the display of the first device is configured to receive a touch input, and to display a respective visual response upon receiving the touch input that resembles a surface of water being touched at a location of the touch input.

9. The system of claim 1, further comprising a second display on the second device, and wherein the second device is configured to receive a touch input, and to display a respective visual response upon receiving the touch input that resembles a surface of water being touched at a location of the touch input.

10. The system of claim 1, wherein the display of the first device is configured to receive a touch input, and to provide visual feedback around a location on the display that receives the touch input in the form of expanding concentric rings of distortion of a current image shown on the display.

11. The system of claim 10, wherein the concentric rings of distortion are determined from empirical data regarding light transmission and refraction through a liquid/air interface.

12. The system of claim 1, wherein the first device includes a locator element to identify a physical location of the first device, and wherein the second device includes a tracking module to track the physical location of the first device.

13. The system of claim 1, wherein one or both of the first device and the second device are configured to issue an alert to at least the second device when a distance between the first device and the second device exceeds a predetermined maximum aim 1, wherein the first device includes a camera and the second device is able to display on.

14. The system of claim 1, wherein the first device includes a camera and the second device is able to display on a second device display images and/or video captured by the first device camera.

15. The system of claim 1, wherein the second device has a second device display and the first device and the second device each include a camera, and wherein the second device is able to display on the second device display images and/or video captured by the first device camera, and the first device is able to display on the display of the first device images and/or video captured by the second device camera.

16. A system comprising:
    a first processor enabled to the content item;
    a second processor enabled device coupled to the network and configured to control access to and/or to monitor the device having a display for displaying a selected content item made accessible to the first processor enabled device via download and/or streaming from a network, the first processor enabled device having a first device input to interact with the content item, and configured to make changes
    use of the content item by the first processor enabled device;
    a module comprising a processor and heuristic software which when implemented by the processor determines whether the first processor enabled device has utilized the content item to a level of utilization greater than a predetermined value, and provides a suggestion if the level of utilization is greater than the predetermined value;
    a communication module to send the suggestion to the second processor enabled device to provide the first processor enabled device with an updated and/or a second content item; and
    a second device input to approve the suggestion, and to cause the updated and/or a second content item to be made accessible to the first processor enabled device; and
    wherein the first device is configured to save the changes to the content item, at least temporarily, to a memory resident on the first device; communicate the changes to the content item to the network;

wherein the network is configured to communicate the changes to the content item to the second device; and wherein at least one of the network and the second device is configured to save the change to the content item as a revision of the content item to one or more additional memories resident in at least one of the network and the second device.

17. The system of claim 16, wherein the level of utilization is determined by one or more of:

education criteria, and an interest level of a user of the first processor enabled device.

18. The system of claim 16, wherein the level of utilization is determined by an input made by the user into the first device input.

19. The system of claim 16, wherein the level of utilization is determined by an input made by responses to a previously completed set of substantially subjective questions.

* * * * *